United States Patent [19]

Kamimura et al.

[11] Patent Number: 4,909,623

[45] Date of Patent: Mar. 20, 1990

[54] "MICROFILM IMAGE PROCESSING APPARATUS"

[75] Inventors: Kuniaki Kamimura; Kenji Sawada; Yasushi Yamade, all of Osaka, Japan

[73] Assignee: Minolta Camera Kabushiki Kaisha, Osaka, Japan

[21] Appl. No.: 288,851

[22] Filed: Dec. 23, 1988

[30] Foreign Application Priority Data

Dec. 25, 1987 [JP] Japan ................................. 62-332954
Dec. 25, 1987 [JP] Japan ................................. 62-332957

[51] Int. Cl.$^4$ ............................................. G03B 21/14
[52] U.S. Cl. ..................................... 353/101; 353/76; 355/55; 364/525
[58] Field of Search .................. 353/101, 76; 350/570, 350/519, 423, 429, 430; 355/55, 61, 62; 364/525, 571.01, 571.02

[56] References Cited

U.S. PATENT DOCUMENTS

| | | | |
|---|---|---|---|
| 4,278,334 | 7/1981 | Maeda | 353/85 |
| 4,353,627 | 10/1982 | Maemori | 353/101 |
| 4,417,281 | 11/1983 | Hama | 350/429 |
| 4,443,076 | 4/1984 | Itabashi | 353/101 |
| 4,446,526 | 5/1984 | Iwanade | 350/249 |
| 4,666,284 | 5/1987 | Yamada | 355/5 |
| 4,750,821 | 6/1988 | Yamamoto et al. | 350/249 |

FOREIGN PATENT DOCUMENTS 83619 7/1978 Japan ................................. 353/101

Primary Examiner—William A. Cuchlinski, Jr.
Assistant Examiner—Patrick R. Seanlon
Attorney, Agent, or Firm—Burns, Doane, Swecker & Mathis

[57] ABSTRACT

A microfilm image processing apparatus in which a plurality of zoom lenses having different ranges of magnification are provided for selective use and in which each of the zoom lenses has an associated zoom control gear coaxially disposed aroung the lens to be capable of driving the associated zoom lens for axial movement to vary the effective magnification ratio to be achieved by the lens, wherein an angular position detector of, for example, the stroboscopic pickup type is provided in conjunction with the zoom control gear on at least one of the zoom lenses to detect the angular position of each of the zoom lenses and thereby determine the magnification ratios achievable by the individual zoom lenses, and an integral magnification ratio detector is provided in association with the zoom control gear on each of the zoom lenses to detect a particular angular position of the associated zoom control gear, the particular angular position of each zoom lens being such that the zoom lens associated with the gear provides an integral magnification ratio. The magnification ratios determined by the angular position detector are stored into a memory and the magnification ratio to be achieved by a selectged one of the zoom lenses may be corrected when the zoom control gear on the zoom lens is detected to be in the particular angular position thereof.

4 Claims, 18 Drawing Sheets

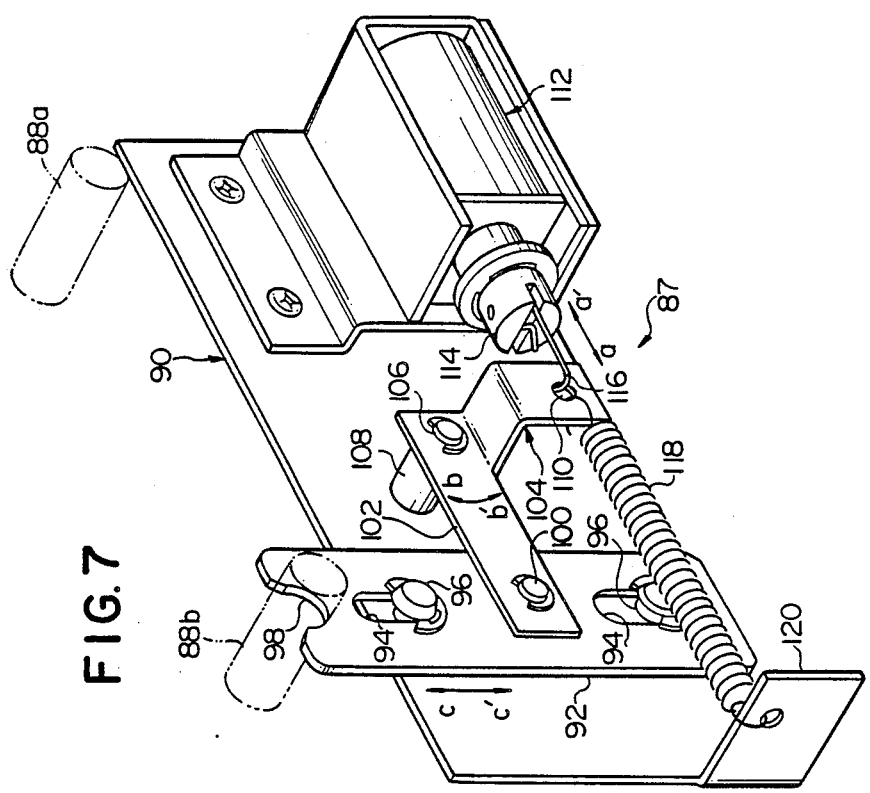
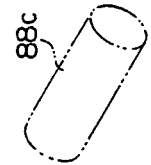
FIG.7

"MICROFILM IMAGE PROCESSING APPARATUS"

FIELD OF THE INVENTION

The present invention relates to a microfilm image processing apparatus such as typically a microfilm reader apparatus or a microfilm reader/printer apparatus and, more particularly, to a microfilm image processing apparatus of the type capable of projecting a beam of light onto a target plane with a variable magnification/reduction ratio.

BACKGROUND OF THE INVENTION

A microfilm image processing apparatus is known which has a plurality of fixed-focus projection lenses respectively having different magnification ratios. An example of such a microfilm image processing apparatus is disclosed in U.S. Pat. No. 4,666,284. In the microfilm image processing apparatus therein taught, any one of a plurality of projection lenses is selectively brought into a position aligned with the path of incoming light so that a beam of light is projected from the selected lens with a magnification/reduction ratio proper to the particular lens.

Where it is desired that an increased number of magnification/reduction ratios be achievable by the known image processing apparatus of this type, as many projection lenses must be provided in the apparatus. Incorporation of such an increased number of projection lenses inevitably results in a proportionate increase in the production cost of the apparatus and in added complexity of the mechanical construction of the apparatus as a whole. ed into the apparatus.

The present invention contemplates elimination of these drawbacks of a prior-art microfilm reader or reader/printer apparatus of the described character.

SUMMARY OF THE INVENTION

Accordingly, it is an important object of the present invention to provide an improved microfilm image processing apparatus using a plurality of zoom lenses having different ranges of magnification and thus capable of projecting a beam of light with a magnification/reduction ratio selected within a sufficiently wide range.

It is another important object of the present invention to provide an improved microfilm image processing apparatus which uses a plurality of zoom lenses and which is capable of accurately detecting the magnification/reduction ratio achievable by the currently selected one of the projection lenses.

In accordance with the present invention, there is provided a microfilm image processing apparatus comprising (a) zoom lens means for projecting an image-carrying beam of light carrying images on a microfilm strip, the zoom lens means comprising a movable member and capable of providing a magnification/reduction ratio variable with movement of the movable member, (b) means for imparting a driving force to the movable member to cause the movable member to move and vary the magnification/reduction ratio to be achieved by the zoom lens means, (c) displacement detecting means for detecting the amount of displacement of the movable member for thereby determining the magnification/reduction ratio to be achieved by the zoom lens means, (d) feature means provided on the movable member, (e) feature detecting means for detecting the feature means, the feature detecting means being disposed to be responsive to the feature means when the movable member is moved to a position enabling the zoom lens means to provide a predetermined magnification/reduction ratio, and (f) correcting means for correcting the magnification/reduction ratio determined by the displacement detecting means when the feature means is detected by the feature detecting means.

In a microfilm image processing apparatus constructed and arranged as hereinbefore described, the zoom lens means may comprise at least one cylindrical zoom lens and in which the movable member is implemented by a zoom control gear disposed around the zoom lens and is rotatable with respect to the zoom lens about the center axis of the lens. In this instance, the displacement detecting means preferably comprises a light emitting element located on one side of the zoom control gear and a light receiving element located on the opposite side of the zoom control gear and substantially aligned with the light emitting element across the gear, the displacement detecting means being operative to detect the teeth of the gear in response the interception of a beam of light emitted from the light emitting toward the light receiving element.

A microfilm image processing apparatus according to the present invention may further comprise memory means for storing data representative of the magnification/reduction ratio determined by the displacement detecting means, wherein the displacement detecting means comprises a rotary-shaft encoder operative to generate pulses in a number proportional to the detected amount of displacement of the movable member, and pulse counting means for counting the number of the pulses generated by the rotary-shaft encoder, the feature detecting means being disposed to be responsive to the feature means when the zoom control gear is turned to an angular position enabling the zoom lens means to provide the predetermined magnification/reduction ratio, the correcting means being operative to correct the magnification/reduction ratio represented by the data stored in the memory means when the feature means is detected by the feature detecting means.

BRIEF DESCRIPTION OF THE DRAWINGS

The features and advantages of a microfilm image processing apparatus according to the present invention will be more clearly appreciated from the following description taken in conjunction with the accompanying drawings in which:

FIG. 7 is a fragmentary perspective view showing the construction and arrangement of scanner locking means included in the microfilm image processing apparatus embodying the present invention;

DESCRIPTION OF THE PREFERRED EMBODIMENTS

A microfilm strip is used on a microfilm reader/printer apparatus which is operative to reproduce a magnified version of an original image on a viewing screen in a reader mode of operation or on a sheet of paper (hereinafter referred to as print sheet) in a printer mode operation. The image information recorded on the microfilm strip is magnified by a projection lens and is projected onto either the viewing screen in a reader mode of operation or onto a photosensitive drum in a printer mode of operation. During printer mode of operation of a reader/printer apparatus, the image magnified by the projection lens is projected through a slit onto the peripheral surface of the photosensitive drum rotating at a fixed speed. An electrostatic image thus produced on the peripheral surface of the photosensitive drum is converted into a visible toner image and is then transferred to and fixed on the surface of a print sheet.

Figure 1:
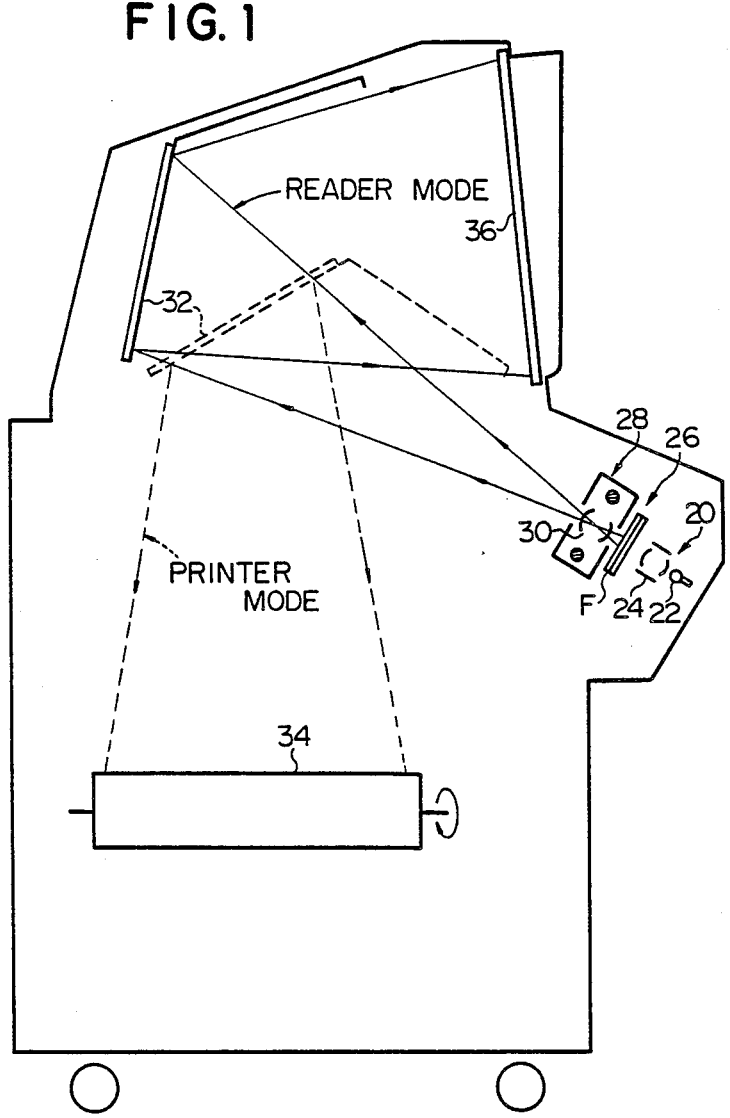
FIG. 1 is a schematic side elevation view showing the general construction and arrangement of a microfilm reader/printer apparatus embodying the present invention.

FIG. 1 schematically shows the general arrangement of a microfilm reader/printer apparatus embodying the present invention and having these reader and printer modes of operation. The reader/printer apparatus comprises an illuminating optical unit 20 including a source of light implemented by a lamp 22 and a collimating lens 24 composed of a plurality of component lens elements. The reader/printer apparatus further comprises a microfilm holder unit 26 and an image scanner assembly 28 provided in conjunction with this illuminating optical unit 20. The microfilm holder unit 26 is positioned intermediate between the optical unit 20 and the image scanner assembly 28 and is adapted to hold in place the microfilm strip F to be irradiated with a beam of light emanating from the optical unit 20. As will be described in more detail, the image scanner assembly 28 includes a plurality of cylindrical projection lenses herein represented by reference numeral 30 and allows selection of any of the magnification/reduction ratios respectively achievable by the individual projection lenses 30.

The microfilm reader/printer apparatus having such a multiple-lens image scanner assembly 28 has two different paths of light from the image scanner assembly 28. One path of light leads from the image scanner assembly 28 to a plane reflector mirror 32 in a first position indicated by broken lines and is re-directed from the reflector mirror 32 to a cylindrical photosensitive drum 34. This path of light from the image scanner assembly 28 to the photosensitive drum 34 is selected for use during printer mode of operation of the reader/printer apparatus. The other path of light in the apparatus leads from the image scanner assembly 28 to the plane reflector mirror 32 in a second position indicated by full lines and is re-directed from the reflector mirror 32 to an image viewing screen 36. This path of light from the image scanner assembly 28 to the viewing screen 36 is selected for use during reader mode of operation of the reader/printer apparatus. The reflector mirror 32 thus used during each of the printer and reader modes of operation is rockable between the two positions indicated by the full and broken lines about an axis fixed win the apparatus.

As will be described in more detail, the image scanner assembly 28 as a whole is driven to move laterally within the apparatus at a speed proportional to the speed of rotation of the photosensitive drum 34 for producing electrostatic latent images on the peripheral surface of the drum 34. The construction and operation of the image reproducing means by which electrostatic images are to be thus produced on the peripheral surface of the photosensitive drum 34 is well known in the art and will not be herein shown and described. It may be noted that the photosensitive drum 34 herein shown is representative of a light receiving member of a microfilm image processing apparatus according to the present invention and may be substituted by a solid-state image pickup tube, or any semiconductor image sensing unit using, for example, charge-coupled devices (CCD's) if desired.

Figure 2:
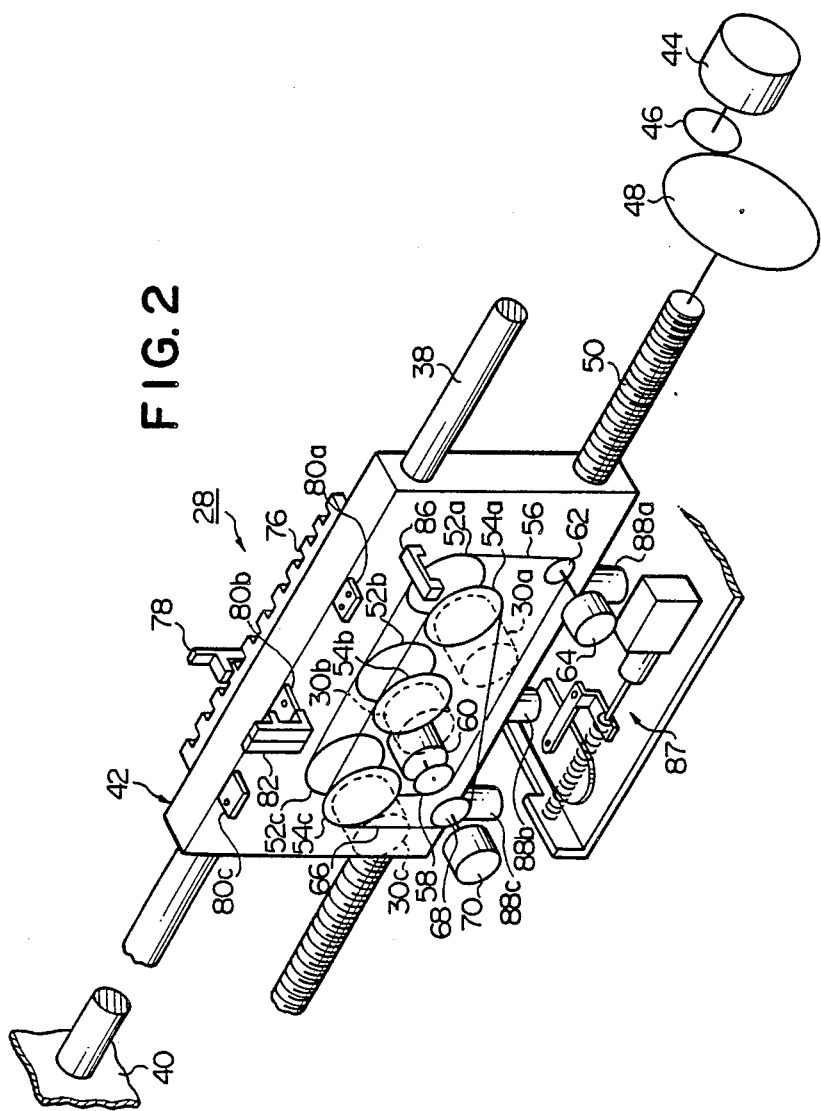
FIG. 2 is a fragmentary perspective view showing the general construction and arrangement of an image scanner assembly which forms part of the microfilm reader/printer apparatus embodying the present invention.

FIG. 2 shows the general construction and arrangement of the image scanner assembly 28 incorporated in the microfilm reader/printer apparatus embodying the present invention.

As shown, the image scanner assembly 28 comprises an elongated guide member 38 extending laterally within the apparatus and secured at its opposite ends to a stationary ff, indicated at 40, of the apparatus. On this guide member 38 is supported a movable carriage member 42 which is slidable on and along the guide member 38 and is thus movable with respect to the ff 40 in a lateral direction of the apparatus.

The carriage member 42 is driven for movement along the guide member 38 by drive means including a scanner drive motor 44 ($M_{SD}$) mounted on the ff 40. The scanner drive motor 44 has an output shaft carrying a drive gear 46 in mesh with a driven gear 48 which, in combination with the drive gear 46, a reduction gear assembly. The driven gear 48 of such a reduction gear assembly is coupled with a threaded screw rod 50 axially extending through the carriage unit 42 and journalled at its leading end in the ff 40. The screw rod 50 is held against axial movement with respect to the ff 40 but is rotatable about its axis with respect to the ff 40. Though not shown in the drawings, the carriage unit 42 has incorporated therein a nut member which is internally in mesh with the threaded screw rod 50. The nut member thus provided in the carriage unit 42 is fixed within the carriage unit 42 is accordingly held against rotation and axial movement with respect to the carriage unit 42. When the scanner drive motor 44 is in operation, the screw rod 50 is driven for rotation about its axis so that the nut member and accordingly the carriage member 42 per se are caused to move along the guide member 38. As the scanner drive motor 44 for driving the carriage unit 42 for movement along the guide member 38 is preferably used a d.c. servo motor having a built-in rotary-shaft encoder so that the carriage unit 42 can be moved to a correct position on the screw rod 50 at a precisely controlled speed.

As indicated by broken lines in FIG. 2, the carriage unit 42 of the image scanner assembly 28 has carried thereon a plurality of projection lenses including first, second and third projection lenses 30a, 30b and 30c which are arranged at equal distances from each other along the guide member 38. The first projection lens 30a is provided in the form of a zoom lens having a magnification/reduction ratio (hereinafter referred to simply as magnification ratio) variable from 1:7 to 1:9. The second projection lens 30b is provided in the form of a zoom lens having a magnification ratio variable from 1:9 to 1:16 and the third projection lens 30c is provided in the form of a zoom lens having a magnification ratio variable from 1:16 to 1:24. As will be understood as the description proceeds, any one of these three projection lenses 30a, 30b and 30c having different magnification ratio ranges is selectively moved into a position aligned with the path of incoming light as the carriage unit 42 is moved along the guide member 38. The position which each of the projection lenses 30a, 30b and 30c may have in line with the path of incoming light will be herein referred to as "optically aligned" position of the projection lens.

Figure 3:
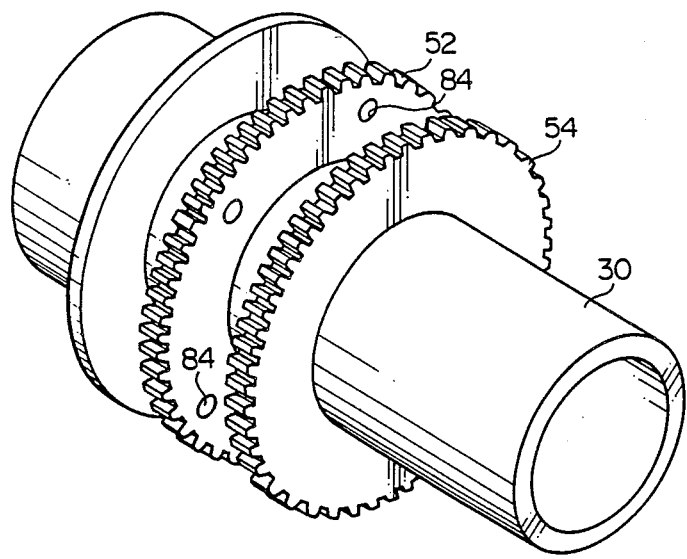
FIG. 3 is a perspective view showing the arrangement of the zoom and focus control means provided in conjunction with each of the projection lenses carried on the image scanner assembly illustrated in FIG. 2.

In association with the projection lenses 30a, 30b and 30c thus carried on the carriage unit 42 are provided combinations of a zoom control gear 52a and focus control gear 54a, a zoom control gear 52b and focus control gear 54b, and a zoom control gear 52c and focus control gear 54c, respectively. In FIG. 3 are illustrated a projection lens representative of the projection lenses 30a, 30b and 30c and the associated combination of a zoom control gear 52 representative of the zoom control gears 52a, 52b and 52c and a focus control gear 54 representative of the zoom control gears 54a 54b and 54c. As shown in FIG. 3, the zoom an focus control gears 52 and 54 are coaxially secured to the cylindrical projection lens 30 and are axially spaced apart in parallel from each other. As the zoom control gear 52 is driven to turn in either direction, the projection lens 30 carrying the zoom control gear 52 has its effective magnification ratio increased or decreased within the range predetermined for the lens 30. Likewise, the projection lens 30 has its effective focal distance increased or decreased within the range predetermined for the lens 30 as the focus control gear 54 is driven to turn in either direction.

Turning back to FIG. 2, the image scanner assembly 28 further comprises zoom control means comprising an endless driving chain 56 passed on the zoom control gears 52a, 52b and 52c. In the embodiment herein shown, the endless drive chain 56 thus forming part of the zoom control means is further passed on a gear 58 axially coupled to the output shaft of a zooming drive motor 60 ($M_{ZD}$) and a gear 62 axially coupled to a rotary-shaft encoder unit 64. The zooming drive motor 60 is provided preferably in the form of a reversible pulse motor or a reversible d.c. servo motor and is supported on the carriage unit 42. When the zooming drive motor 60 is in operation having its output shaft rotated in either direction, the rotation of the motor output shaft is transmitted through the gear 58 and the driving chain 56 to each of the zoom control gears 52a, 52b and 52c so that each of the projection lenses 30a, 30b and 30c has its effective magnification ratio increased or decreased within the range predetermined for the lens 30a, 30b or 30c. The rotation of the motor output shaft is transmitted through the driving chain 56 to the gear 62 coupled to the rotary-shaft encoder unit 64, which is thus enabled to detect the angle through which each of the projection lenses 30a, 30b and 30c is turned about the center axis thereof. Thus, the rotary-shaft encoder unit 64 produces a digital signal $S_{MR}$ indicative of the angle of turn thus detected of each of the projection lenses 30a, 30b and 30c. The angle of turn represented by the signal $S_{MR}$ indicates the magnification ratio currently achievable by the projection lens 30a, 30b or 30c held in the "optically aligned" position thereof.

The image scanner assembly 28 included in the embodiment of the present invention further comprises an endless driving chain 66 passed on the focus control gears 54a, 54b and 54c and further on a gear 68 axially coupled to the output shaft of a focusing drive motor 70 ($M_{FD}$). The focusing drive motor 70 is also provided preferably in the form of a reversible pulse motor or a reversible d.c. servo motor and is supported on the carriage unit 42. When the focusing drive motor 70 is in operation having its output shaft rotated in either direction, the rotation of the motor output shaft is transmitted through the gear 68 and the driving chain 66 to each of the focus control gears 54a, 54b and 54c so that each of the projection lenses 30a, 30b and 30c has its effective focal distance increased or decreased within the range predetermined for the lens 30a, 30b or 30c.

Figure 4:
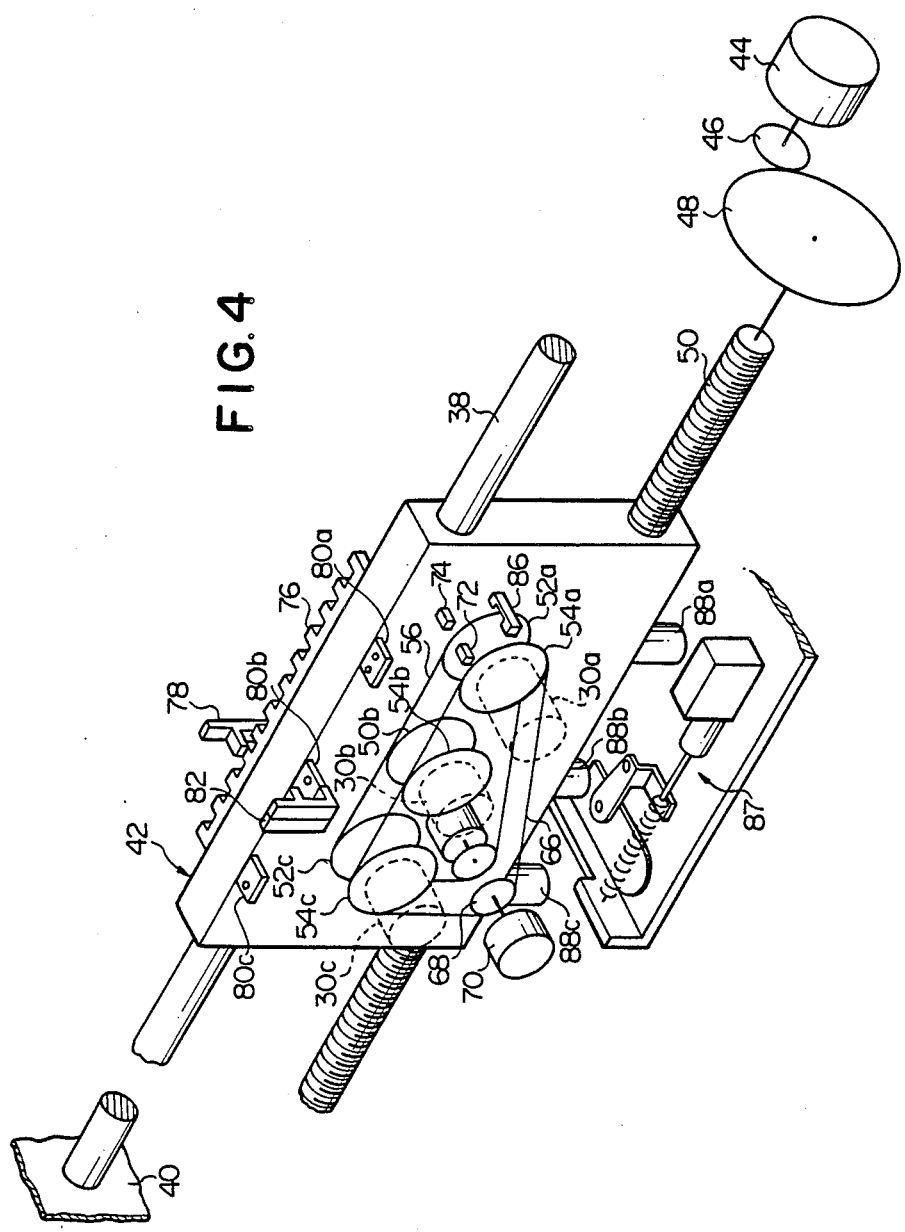
FIG. 4 is a view similar to FIG. 1 but shows the general construction and arrangement of a modification of the microfilm reader/printer apparatus illustrated in FIG. 1.
Figure 5:
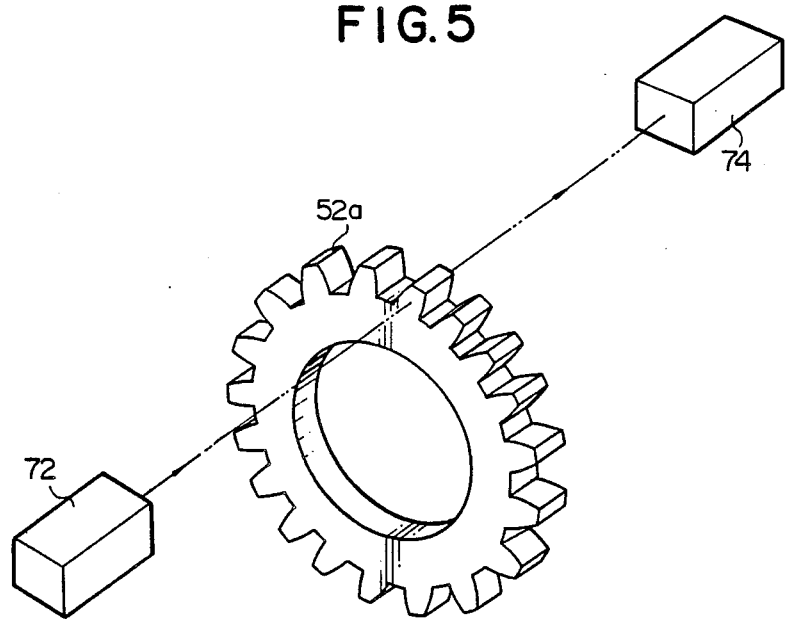
FIG. 5 is a perspective view showing, to an enlarged scale, the arrangement of the magnification ratio detector provided in conjunction with the zoom control means included in the image scanner assembly illustrated in FIG. 2.

It will be apparent that, if desired, the zoom or focus control means implemented by the combination of the driving chain and the zoom or focus control gears as used in the embodiment of the present invention may be substituted by a similar combination of an endless drive belt and pulleys securely mounted on the projection lenses 30a, 30b and 30c, respectively. Where the zoom control means is provided by the combination of the driving chain 56 and the zoom control gears 52a, 52b and 52c as in the embodiment of the present invention, the combination of the gear 62 and the rotary shaft encoder unit 64 may be substituted by stroboscopic pickup means provided by a combination of a light source element 72 and a photosensitive element 74 as indicated in FIG. 4 and to an enlarged scale in FIG. 5. The light source element 72 is implemented typically by a light emitting diode (LED) and the photosensitive element 74 implemented typically by a phototransistor or a photodiode. The combination of these light source and photosensitive elements 72 and 74 are provided in conjunction with any one of the zoom control gears such as the zoom control gear 52a associated with the first projection lens 30a. Furthermore, the light source and photosensitive elements 72 and 74 are located so that a beam of light emitted from the light source element 72 toward the photosensitive element 74 is incident on an outer circumferential marginal area, viz., a toothed area of the zoom control gear 52a as shown in FIGS. 4 and 5. With the light source and photosensitive elements 72 and 74 thus located with respect to the zoom control gear 52a, a beam light constantly emanating from the light source element 72 toward the photosensitive element 74 is cyclically intercepted by the teeth of the gear 52a and is accordingly cyclically allowed to reach the photosensitive element 74 as the zoom control gear 52a turns about its axis. The photosensitive element 74 is thus enabled to output a train of impulses of a number proportional to the angle through which the zoom control gear 52a and accordingly each of the projection lenses 30a, 30b and 30c is turned about the center axis thereof. The angle of turn thus detected of each of the projection lenses 30a, 30b and 30c is a function of the magnification ratio currently achievable by the projection lens 30a, 30b or 30c.

To detect the position of the carriage unit 42 with respect to the guide member 38, there is provided a scanner position detector which comprises an elongated toothed member 76 securely attached to the carriage unit 42 and extending in parallel with the guide member 38. In conjunction with this toothed member 76 is provided a tooth sensor 78 fixedly located with respect to the ff 40 and operative to produce a scanner position signal $S_{SP}$ of logic value "1" responsive to a tooth in the toothed member 76. As the carriage unit 42 is driven to move in either direction along the guide member 38, the tooth sensor 78 produces a scanner position signal $S_{SP}$ composed of pulses of a number proportional to the distance of movement of the carriage unit 42 on the guide member 38. The number of the pulses forming the scanner position signal $S_{SP}$ output from the tooth sensor 78 is thus indicative of the position of the carriage unit 42 with respect to the guide member 38 and accordingly the lateral position which the carriage unit 42 has with respect to each of the photosensitive drum 34 and viewing screen 32 (FIG. 1).

On the carriage unit 42 is further provided a selected lens detector comprising apertured members 80a, 80b and 80c securely attached to the carriage unit 42 and vertically aligned with the individual projection lenses 30a, 30b and 30c, respectively. Each of the apertured members 80 is formed with an aperture or apertures provided in a number and at a location or locations proper to the particular projection lens. For example, the rightmost apertured member 80a my have two apertures located adjacent the opposite side ends of the member 80a to indicate a logic notation "11" for the first projection lens 30a. The intermediate apertured member 80b may have a single aperture located adjacent the right side end of the member 80b to indicate a logic notation "01" for the second projection lens 30b and the leftmost apertured member 80c may have a single aperture located adjacent the left side end of the member 80c to indicate a logic notation "10" for the third projection lens 30c. The presence or absence and the location or locations of the aperture or apertures in each ff the apertured members 80a, 80b and 80c are detected by an aperture sensor 82 fixedly located with respect to the ff 40. The aperture sensor 82 is operative to produce a selected lens signal $S_{SL}$ of, for example, logic value "11", "01" or "10" responsive to the apertured member 80a, 80b or b0c, respectively, on the carriage unit 42 moved to a position having any of the projection lenses 30a, 30b and 30c brought into the optically aligned position thereof. The selected lens signal $S_{SL}$ output from the aperture sensor 82 is thus indicative of which of the projection lenses 30a, 30b and 30c is currently selected for use and accordingly of the range of the magnification ratio currently available by the image scanner assembly 28.

As shown in FIG. 3, the zoom control gear associated with one of the projection lenses 30a, 30b and 30c is formed with a plurality of index apertures 84 which are equidistantly spaced apart from each other circumferentially of the zoom control gear. The index apertures 84 thus formed in the zoom control gear 52a, 52b or 52c are located in correspondence with the rotational position of the associated projection lens turned to any of the positions providing a magnification ratio expressed by integers such as the magnification ratio 1:7, 1:8 or 1:9 for the first projection lens 30a. These apertures 84 form part of an integral magnification ratio detector which further comprises an aperture sensor 86 (FIG. 2) responsive to each of the apertures 84 to produce an integral magnification ratio signal $S_{IMR}$ of logic value "1". The integral magnification ratio signal $S_{IMR}$ of logic value "1" thus output from the aperture sensor 86 indicates that the projection lens associated with the apertured zoom control gear and accordingly each of the other projection lenses is in a rotational position providing any one of the integral magnification ratios achievable by the projection lens. As will be described, the integral magnification ratio signal $S_{IMR}$ is used to compensate for the magnification ratio data stored in a memory.

The aperture sensor 86 to produce such a signal may be implemented by a combination of a light source element such as a light emitting diode and a photosensitive element implemented by a phototransistor or a photodiode, though not shown in the drawings. These light source and photosensitive elements are located so tat a beam of light emitted from the light source element toward the photosensitive element is allowed to reach the photosensitive element when passed through any of the apertures in the zoom control gear 52.

Though not shown in the drawings but as well known in the art, a zooming mechanism for a cylindrical lens unit ordinarily includes an inner sleeve enclosing the cylindrical lens unit and having a radially outwardly projecting cam follower and an outer sleeve formed with a cylindrical cam into which the cam follower projects.

In the image scanner assembly 28 of the microfilm image processing apparatus embodying the present invention, the outer sleeve on the second projection lens 30b has a cylindrical cam extending in opposite direction to that provided in the outer sleeve on each of the first and third projection lenses 30a and 30c. When the drive chain 56 is driven to endwise move in either direction, all the zoom control gears 52a, 52b and 52c are caused to turn in the same directions so that the projection lens associated with each zoom control gear is driven to axially move forwardly or rearwardly. Because, in this instance, of the fact that the cylindrical cam for the second projection lens 30b extends in opposite direction to that for each of the first and third projection lenses 30a and 30c, the second projection lens 30b is axially moved in the opposite direction to each of the first and third projection lenses 30a and 30c.

Figure 6:
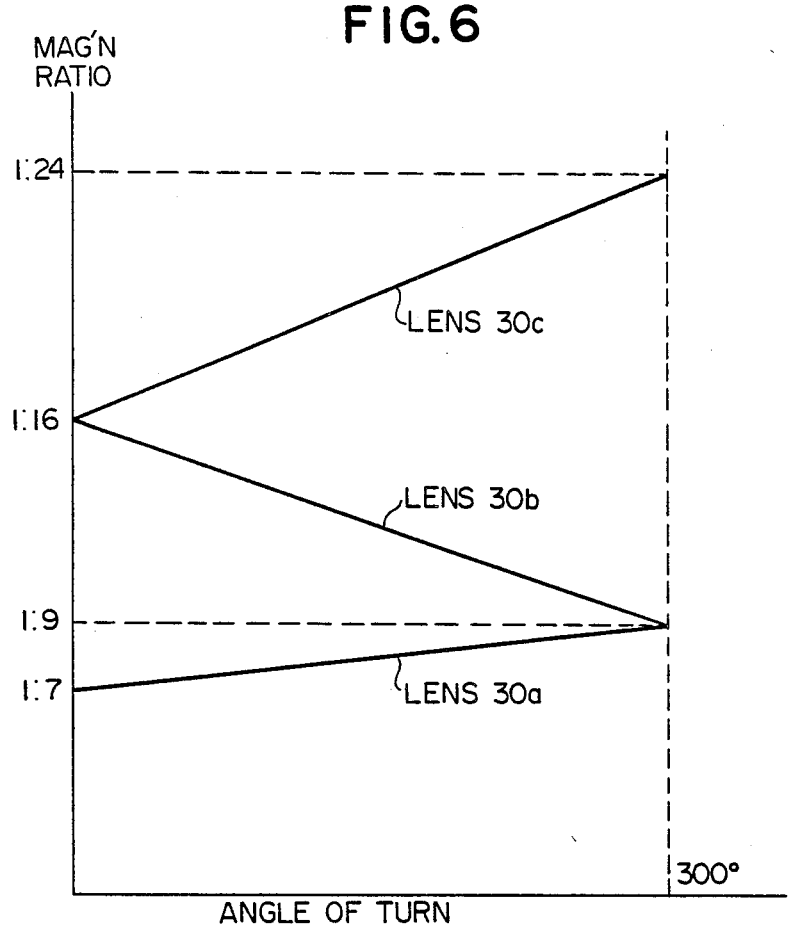
FIG. 6 is a graphic representation of the relationship between the angle of turn of the zoom control gear associated with each of the projection lenses used in the reader/printer apparatus embodying the present invention and the ranges of the magnification ratio achievable by each of the projection lenses.

Accordingly, if each of the first and third projection lense 30a and 30c is driven to axially move in a direction to increase the magnification ratio achievable by the lens 30a or 30c, the second projection lens 30b is driven to axially move in a direction to decrease the magnification ratio achievable by the lens 30b, and vice versa. In this fashion, when the first projection lens 30a is driven to move in a direction to increase the magnification ratio from 1:7 to 1:9 and the third projection lens 30c i driven to move in a direction to increase the magnification ratio from 1:16 to 1:24, then the second projection lens 30b is driven to move in a direction to decrease the magnification ratio from 1:16 to 1:9, as will be seen from FIG. 6. Conversely, when the second projection lens 30b is driven to move in a direction to increase the magnification ratio from 1:9 to 1:16, then the first projection lens 30a is driven to move in a direction to decrease the magnification ratio from 1:9 to 1:7 and the third projection lens 30c is driven to move in a direction to decrease the magnification ratio from 1:24 to 1:16. This means that when one of the projection lenses 30a, 30b and 30c is moved to an axial position providing the maximum magnification ratio achievable by the lens, the neighboring projection lens or each of the neighboring projection lenses is moved to an axial position providing the minimum magnification ratio achievable by the lens. Through use of the three projection lenses 30a, 30b and 30c, the magnification ratio can thus be varied continuously from the minimum value 1:7 to the maximum value 1:24 with no discontinuity caused between the neighboring lenses.

Throughout a reader mode of operation of the apparatus, the carriage unit 42 must be fixedly held in position with respect to the ff 40 so that the beam of light passed through any of the projection lenses 30a, 30b and 30c is allowed to correctly reach the image viewing screen 32. For this purpose, the microfilm reader/printer apparatus embodying the present invention further comprises scanner locking means 87 to have the carriage unit 42 locked in a position having any of the projection lenses 30a, 30b and 30c held in the optically aligned position thereof.

As illustrated in FIG. 2 or FIG. 4 and to an enlarged scale in FIG. 7, such scanner locking means 87 comprises a plurality of or, in the show arrangement, three lock pins 88a, 88b and 88c projecting downwardly from the carriage unit 42 and spaced apart from each other in a direction parallel with the guide member 38. The scanner locking means 87 further comprises a support member 90 secured to the ff 40 having slidably received thereon a slider plate 92. The slider plate 92 is formed with elongated guide slots 94 which are elongated in a direction perpendicular to the plane containing the respective center axes of the lock pins 88a, 88b and 88c. Slider retainer pins 96 project from the support member 90 into these guide slots 94 so that the slider plate 92 is longitudinally movable along a predetermined path with respect to the support member 90. The slider plate 92 is further formed with a semicircular recess 98 adapted to receive each of the lock pins 88a, 88b and 88c when longitudinally moved in one direction with respect to the support member 90.

On the slider plate 92 is provided a fixed pivot pin 100 which is pivotally engaged by a generally L-shaped lever 104 having a link portion extending in parallel with the support member 90. The lever 104 thus pivotally connected to the slider plate 92 by means of the pivot pin 100 has a fulcrum portion pivotally connected by a pivot pin 106 to a shaft 108 projecting from the support member 90 so that the lever 104 in its entirety is rotatable together with respect to the support member 90 about the center axis of the shaft 108. The lever 104 further has an arm portion formed with an aperture 110 and is driven to turn about the center axis of the shaft 108 by suitable drive means.

The drive means for the lever 104 arranged as hereinbefore described is shown comprising a solenoid-operated actuator unit 112 fixedly mounted on the support member 90 and having a plunger 114 which is axially movable with respect to the support member 90. A coupling element 116 is anchored at one end to the plunger 114 of the solenoid-operated actuator unit 112 and at the other to the arm portion of the lever 104 through the aperture 110 in the arm portion.

The plunger 114 of the solenoid-operated actuator unit 112 is axially movable with respect to the support member 90 in directions indicated by arrows a and a'. As the plunger 114 is thus axially moved with respect to the support member 90 in the directions of arrows a and a', the lever 104 is caused to turn with respect to the support member 90 in directions of arrows b and b', respectively, about the center axis of the shaft 108. The angular movement of the lever 104 in the directions of arrows b and b', in turn, is followed by longitudinal movement of the slider plate 92 with respect to the support member 90 in directions indicated by arrows c and c', respectively. The solenoid-operated actuator unit 112 is such that the plunger 114 thereof is to axially move in the direction of arrow a when de-energized and in the opposite direction of arrow a' when energized. The lever 104 is urged to turn in the direction of arrow b and accordingly the slider plate 90 urged to move in the direction of arrow c by suitable biasing means. In the arrangement herein shown, such biasing means comprises a helical tension spring 118 which is anchored at one end to the arm portion of the lever 104 through the aperture 110 in the arm portion and at the other to a lug portion 120 of the support member 90 through an aperture formed in the lug portion 120.

When the solenoid-operated actuator unit 112 remains de-energized and the plunger 114 thereof is allowed to move in the direction of arrow a, the lever 104 and accordingly the link member 102 are caused to turn in the direction of arrow b by the force of the tension spring 11. Accordingly the slider plate 92 is caused to move in the direction of arrow c to project outwardly of the support member 90. If, in this instance, the carriage unit 42 carrying the lock pins 88a, 88b and 88c is held in a position having any of the pins 88a, 88b and 88c located to be engageable with the slider plate 92, the slider plate 92 thus moved to project outwardly of support member 80 is brought into locking engagement with the particular lock pin 88a, 88b or 88c and has the lock pin received in the recess 98 therein. The result is that the carriage unit 42 as a whole is fixedly held in the position having any of the projection lenses 30, 30b and 30c held in its optically aligned position aligned with the path of incoming light.

When the actuator unit 112 is thereafter energized, the plunger 114 of the actuator unit 112 is caused to axially retract in the direction of arrow a' so that the lever 104 is caused to turn in the direction of arrow b' against the force of the tension spring 118. Accordingly, the slider plate 92 is caused to move in the direction of arrow c' and as a consequence the slider plate 9 is disengaged from the lock pin 88a, 88b or 88c which has been received in the recess 98 therein. The carriage unit 42 is now allowed to move with respect to the carriage unit 42 along the guide member 38.

Figure 8:
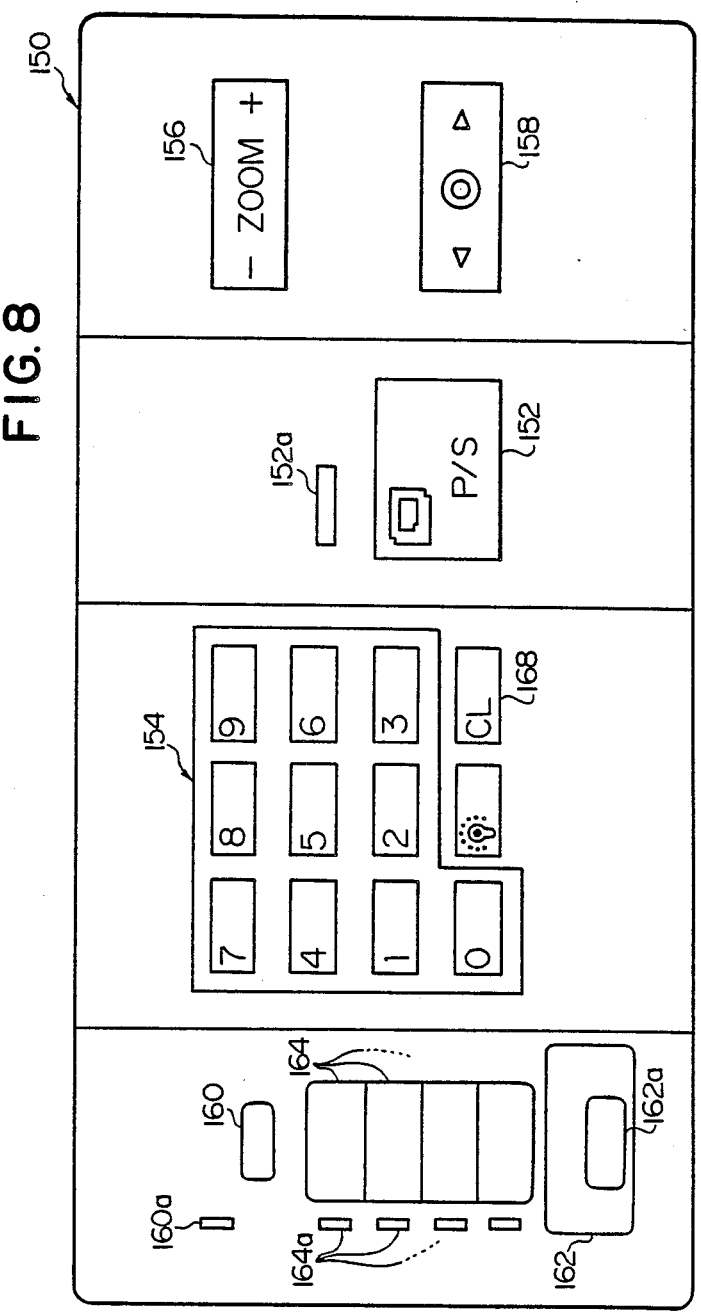
FIG. 8 is a view showing the general key and indicator arrangement of a control panel also included in the microfilm image processing apparatus embodying the present invention.

FIG. 8 shows the general key and indicator configuration of a control panel 150 which forms part of the apparatus embodying the present invention. The control panel 150 comprises a print start key 152 (P/S) to enable the apparatus to start printing operation. In conjunction with this print start key 152 is provided an indicator 152a which is to be turned on to illuminate when printing operation is in progress in the apparatus. On the control panel 150 is further provided a set of numerical keys 154 allocated to numerals 1, 2, ... and 0, respectively, and used to enter a desired magnification ratio for reproduction of images during reader or printer mode of operation of the apparatus.

Further provided on the control panel 150 is a zoom-in/zoom-out key 156 for continuously varying the magnification ratio between the minimum ratio 1:7 and the maximum ratio 1:24. When depressed in a zoom-in direction, viz., near the left end of the zoom-in/zoom-out key 156, the image to be reproduced is "zoomed in" and the magnification ratio is decreased continuously (or, exactly, stepwise at small pitches) toward the minimum ratio of 1:7 as long as the key 156 is kept depressed. Conversely, when depressed in a zoom-out direction, viz., near the right end of the key 156, the image to be reproduced is "zoomed out" and the magnification ratio is increased toward the maximum ratio of 1:24 as long as the key 156 is kept depressed. The operator of the apparatus may release the key 156 when it is determined from the images displayed on the viewing screen 32 that the desired magnification ratio is achieved.

There is further provided a focus control key 158 for continuously varying the effective focal length of the projection lens 30a, 30b or 30c currently selected for use. When depressed near one or the other end of the key 158, the effective focal length of the selected projection lens 30a, 30b or 30c is continuously increased or decreased, respectively, as long as the key 156 is kept depressed. The operator of the apparatus may release the key 158 when it is determined from the images displayed on the viewing screen 32 that the images reproduced are properly focussed on the viewing screen 32 (and accordingly on the photosensitive drum 34).

The control panel 150 of the apparatus embodying the present invention further comprises memory set key 160, memory zoom key 162, and memory area select keys 164. The memory set key 160 is used to store into a memory the data representative of the magnification ratio entered through use of the numerical keys 154. The memory zoom key 162 is used to select the magnification ratio which has thus been stored in any of the data storage areas of the memory. (The data storage area of the memory into which the magnification ratio entered from the control panel 150 is any one of the data storage areas 174a, 174b and 174c of the random-access memory 174 to be described with reference to FIGS. 9 and 10.) The data storage area of the memory from which the magnification ratio data is to be read out can be selected through manipulation of any of the memory area select keys 164. Each of these keys 160, 162 and 164 has an associated indicator which is to be turned on when the associated key is depressed, such indicators being designated by like reference numerals with a subscript "a" affixed to each numeral.

On the control panel 150 is further provided a clear key 168 which is to be used to clear the numerical value of the magnification ratio once entered through use of any of the numerical keys 152.

Figure 9:
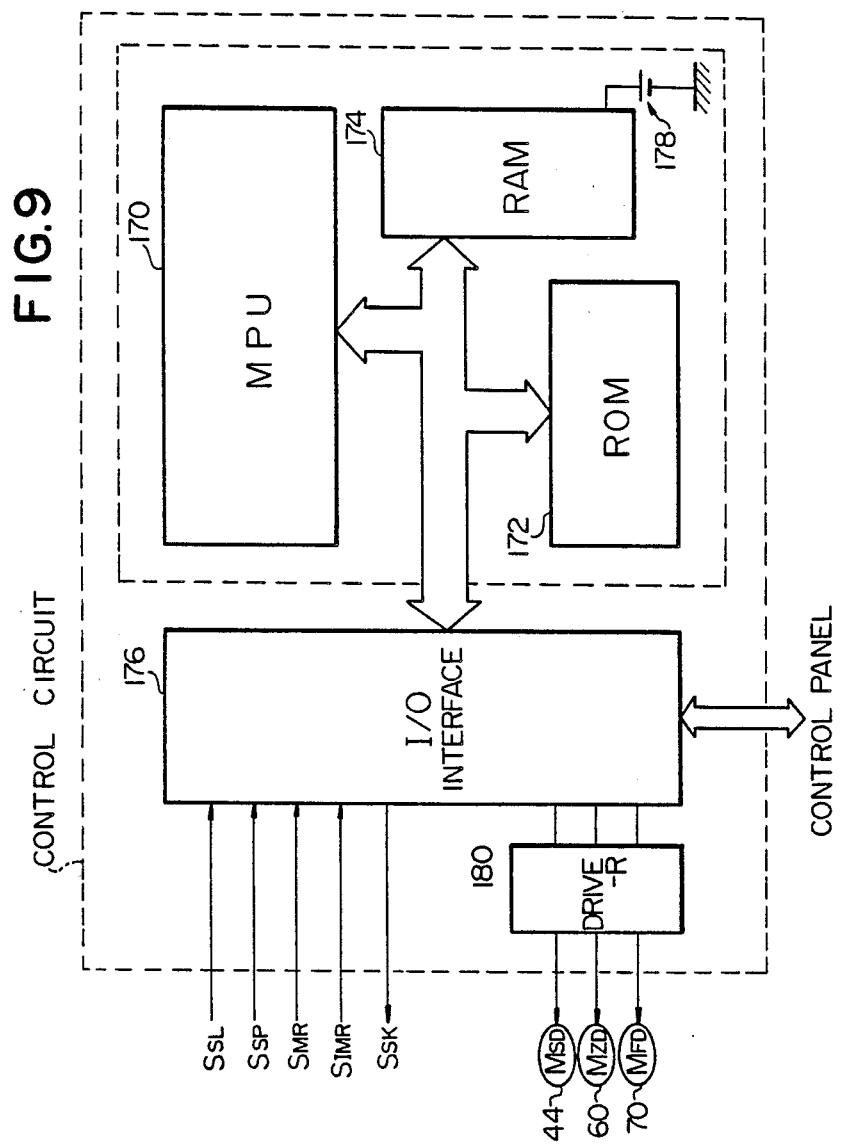
FIG. 9 is a block diagram showing the general arrangement of a control circuit further included in the microfilm image processing apparatus embodying the present invention.

FIG. 9 shows the general arrangement of a control circuit which may be used to achieve the various functions to be performed in the apparatus embodying the present invention. The control circuit comprises a semiconductor integrated-circuit microprocessor 170 (MPU) which has interrupt and data input and output ports connected to a read-only memory 172 (ROM), a random-access memory 174 (RAM) and an input/output interface network 176 through a bus.

In the read-only memory 172 are fixedly stored the data representative of all the routine an subroutine programs to be executed by the microprocessor 170 and the data representative of the various parameters and numerical values which may be used in executing such routine and subroutine programs. The numerical values thus stored in the read-only memory 172 include those indicating the ranges of the magnification ratio respectively achievable by the individual projection lenses 30a, 30b and 30c provided in the image scanner assembly 28.

The random-access memory 174 (which will be hereinafter referred to as memory 174) is used to store the data which may be generated from the signals produced in the control panel 150, the data generated from the signals output from the various sensors and detectors provided in the apparatus, and the data representative of the results of the calculation which may be performed in the microprocessor 170 on the basis of the data fetched from the read-only memory 172 or the data which may be generated from the signals produced in the control panel 150. The memory 174 is provided with a backup power supply source 178 to retain the data stored into the memory 174. The data generated from the signals output from the various sensors and detectors include the signal $S_{SL}$ output from the aperture sensor 82 of the selected lens detector, the signal $S_{SP}$ output from the tooth sensor 78 of the scanner position detector, the signal $S_{MR}$ output from the rotary-shaft encoder unit 64, and the signal $S_{IMR}$ output from the aperture sensor 86 of the integral magnification ratio detector. Each of these signals $S_{SL}$, $S_{SP}$, $S_{MR}$ and $S_{IMR}$ is supplied through the input/output interface network 176 to the microprocessor 170 and is thence loaded into the memory 174.

Figure 10:
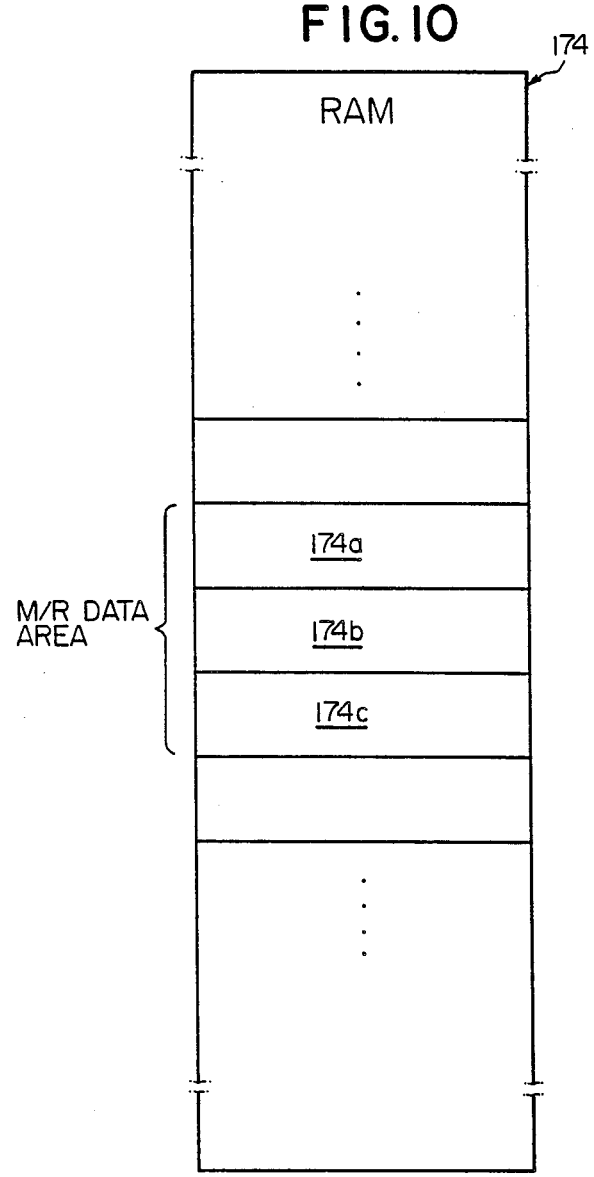
FIG. 10 is a view showing a portion of the memory map of the random-access memory incorporated in the control circuit illustrated in FIG. 9.

As schematically illustrated in FIG. 10, the memory 174 has data storage areas 174a, 174b and 174c assigned to the data representative of the magnification ratios entered through use of the numerical keys 154 on the control panel 150 (FIG. 8) to be achieved by the first, second and third projection lenses 30a, 30b and 30c, respectively. The data representative of the magnification ratio entered from the control panel 150 is stored into any one of these data storage areas 174a, 174b and 174c with the memory set key 160 depressed. The data thus stored into any of the data storage areas 174a, 174b and 174c is fetched and the magnification ratio represented by the data is selected with the memory zoom key 162 depressed. The data storage area 174a, 174b or 174c into which the magnification ratio data is to be stored is selected depending on the magnification ratio which will fall within any one of the ranges of magnification ratio achievable by the projection lenses 30a, 30b and 30c.

The microprocessor 170 is also operative to generate signals to energize and de-energize the scanning drive motor 44 ($M_{SD}$), zooming drive motor 60 ($M_{ZD}$), and focusing drive motor 70 ($M_{FD}$). These signals are supplied through the input/output interface network 176 to respective driver circuits 180 for the motors 44, 60 and 70. Also generated by the microprocessor 170 is a signal $S_{SK}$ to energize and de-energize the solenoid-operated actuator unit 112 forming part of the scanner locking means 87 described with reference to FIG. 7. The scanner lock signal $S_{SK}$ is passed through the input/output interface network 176 to suitable switch means (not shown) intervening between the actuator unit 112 and the power supply source therefor.

Figure 11:
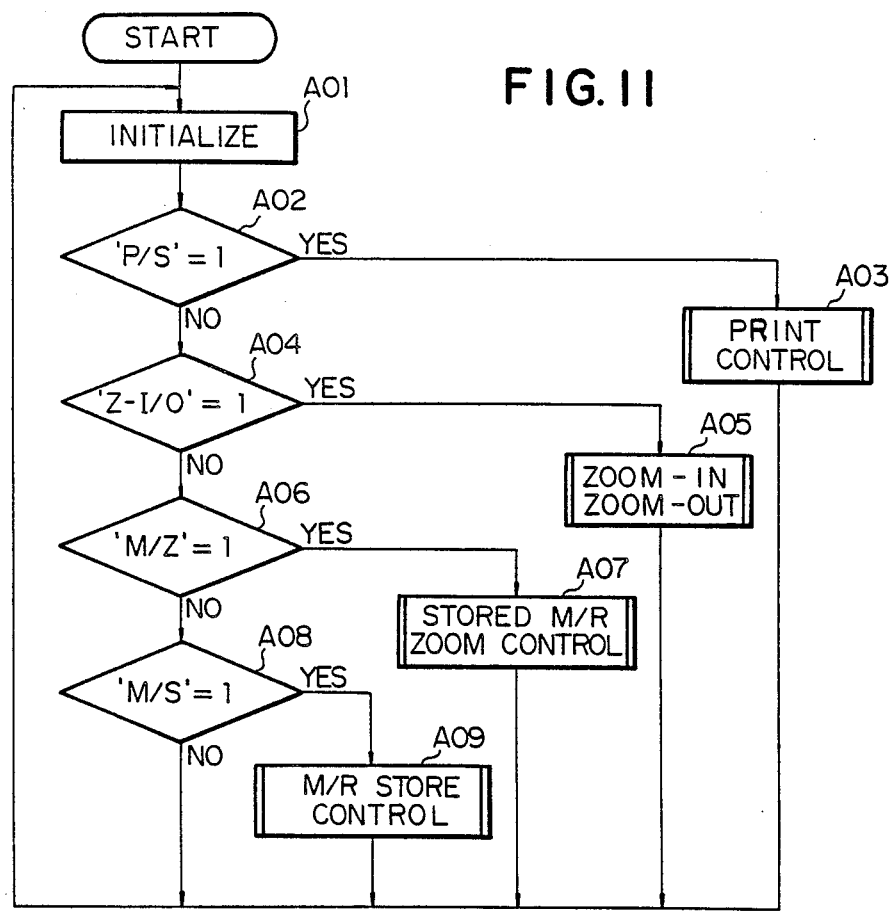
FIG. 11 is a flowchart showing a main routine program to be executed by the microprocessor 170 incorporated in the control circuit illustrated in FIG. 9.

FIG. 11 shows the main routine program to be executed by the microprocessor 170 provided in the control circuit hereinbefore described with reference to FIG. 9. The microprocessor 170 starts execution of the main routine program with the apparatus initially switched in and first proceeds to step A01 to initialize the memory 174 and the memory areas of its own. All the conditions and modes of operation to be controlled by means of the microprocessor 170 and the parameters and numerical values which may have been left in the memory 174 are thus selected in accordance with the prescribed default rules.

The microprocessor 170 thereafter proceeds to step A02 and checks if the there is present a signal "P/S" of logic value "1" with the print start switch 152 depressed on the control panel 150. If it is found at this step A02 that there is such a signal "P/S" present and accordingly the answer for the step A02 is given in the affirmative, the microprocessor 170 proceeds to print control subroutine program A03. The details of this print control subroutine program A03 will be hereinafter described with reference to FIG. 12. Upon termination of the subroutine program A03, the microprocessor 170 returns to step A02.

If it is found at step A02 that there is not present the signal "P/S" of logic value "1" and thus the answer for the step A02 is given in the negative, then the microprocessor 170 proceeds to step A04 to check if there is present a signal "Z-I/0" of logic value "1" with the zoom-in/zoom-out key 156 on the control panel 150 depressed. It may be herein noted that it is not tested at this step A04 whether the key 56 has been depressed to increase or decrease the magnification ratio. In the presence detected of the signal "Z-I/O" of logic value "1" and accordingly the answer for the step A04 is given in the affirmative, the microprocessor 170 proceeds to zoom-in/zoom-out control subroutine program A05. The details of this zoom-in/zoom-out control subroutine program A05 will be hereinafter described with reference to FIGS. 13, 13B and 13C. Having executed the subroutine program A05, the microprocessor 170 also returns to step A02.

Figure 14A:
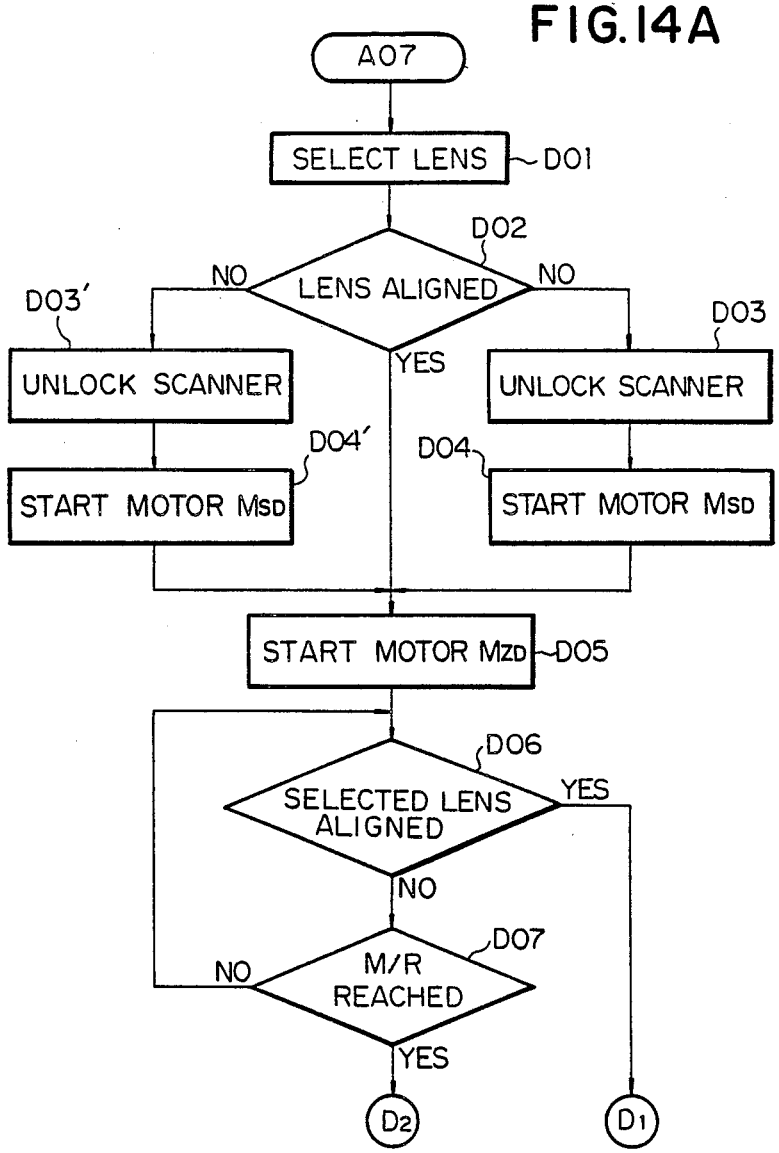
FIGS. 14A and 14B are flowcharts showing the details of a stored magnification ratio zoom control subroutine program included in the main routine program illustrated in FIG. 11.

If it is found at step A04 that there is not present the signal "Z-I/O" of logic value "1" and thus the answer for the step A04 is given in the negative, then the microprocessor 170 proceeds to step A06 to check if there is present a signal "Z/M" of logic value "1" with the zoom memory key 162 on the control panel 150 depressed. If it is found at this step A06 that there is such a signal "M/Z" present and accordingly the answer for the step A06 is given in the affirmative, the microprocessor 170 proceeds to stored magnification ratio zoom control subroutine program A07. The details of this stored magnification ratio zoom control subroutine program A07 will be hereinafter described with reference to FIGS. 14A and 14B. Upon termination of the subroutine program A07, the microprocessor 170 also returns to step A02.

If it is found at step A06 that there is not present the signal "M/Z" of logic value "1" and thus the answer for the step A06 is given in the negative, then the microprocessor 170 proceeds to step A08 to check if there is present a signal "M/S" of logic value "1" with the memory set key 160 on the control panel 150 depressed. In the presence detected of the signal "M/S" of logic value "1" and thus the answer for the step A08 is given in the affirmative, the microprocessor 170 proceeds to magnification ratio store control subroutine program A09. The details of this magnification ratio store control subroutine program A09 will be hereinafter described with reference to FIG. 15. On termination of the subroutine program A15, the microprocessor 170 also returns to step A02.

If it is found at step A08 that there is not present the signal "M/Z" of logic value "1" and thus the answer for the step A08 is given in the negative, then the microprocessor 170 also returns to step A02.

Description will be hereinafter made with reference to FIGS. 11 to 16 in regard to the various subroutine programs thus included in the main routine program executed by the microprocessor 170 of the control circuit provided in the apparatus embodying the present invention.

Figure 12:
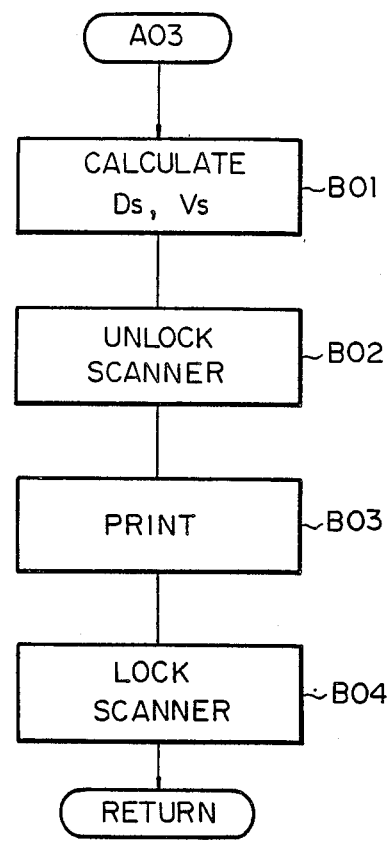
FIG. 12 is a flowchart showing the details of a print control subroutine program included in the main routine program illustrated in FIG. 11.

FIG. 12 is a flowchart showing the details of the print control subroutine program A03 included in the main routine program hereinbefore described with reference to FIG. 11. It may be noted that this print control subroutine program A03 is executed during printer mode of operation of the apparatus in which the reflector mirror 32 is turned to the angular position indicated by broken lines in FIG. 1. The movement of the reflector mirror 32 to this angular position is effected with the print start key 152 depressed on the control panel 150.

The print control subroutine program A03 is executed when it is determined at step A02 of the main routine program that the print start switch 152 on the control panel 150 is depressed and starts with a step B01 at which the microprocessor 170 determines the distance $D_S$ and speed $V_S$ of movement of the carriage unit 42 which is required to move along the guide member 38 (FIG. 2) to scan the photosensitive drum 34. These numerical data are generated on the basis of the size of the print sheet on which images are to be printed and the magnification ratio currently selected. Thereafter, the microprocessor 170 proceeds to step B02 to output the signal $S_{SK}$ to energize the solenoid-operated actuator unit 112 of the scanner locking means 87 (FIG. 7). The solenoid-operated actuator unit 112 being thus activated, the slider plate 92 of the scanner locking means 87 is driven to retract from the position engaging any of the lock pins 88a, 88b and 88c with the result that the carriage unit 42 is unlocked and is allowed to move along the guide member 38 (FIG. 2).

Subsequently to step B02, the microprocessor 170 proceeds to step B03 to output a signal effective to start the scanner drive-motor 44 ($M_{SD}$) into operation to drive the carriage unit 42 to move forwardly on the guide member 38. It will be then detected from the signal $S_{SP}$ from the scanner position detector that the carriage unit 42 being moved on the guide member 38 has reached a predetermined position ahead of the position at which the image scanner assembly 28 is to start scanning of the photosensitive drum 34. This predetermined position of the carriage unit 42 is ahead of the scan start position of the carriage nit 42 through a distance equal to the um of the one half of the scanning distance required and a predetermined "pre-scan" distance. When it is detected that such a predetermined position is reached by the carriage unit 42, the microprocessor 170 outputs a signal o temporarily bring the scanner drive motor 44 to a stop and then detects whether or not the apparatus is ready to start the required cycle of printing operation with, for example, a correctly sized print sheet passed over to the photosensitive drum 34. When it is confirmed that the apparatus is ready to start the required cycle of printing operation, the microprocessor 170 outputs a signal to start the scanner drive motor 44 for a second time to drive the carriage unit 42 for forward movement on the guide member 38 over the scanning distance required for the scanning of the photosensitive drum 34. As the carriage unit 42 is thus moved along the guide member 42, the rotary-shaft encoder incorporated in the scanner drive motor 44 generates a digital signal incremented recurrently so that the microprocessor 170 is constantly informed of the current position of the carriage unit 42 with respect to the photosensitive drum 34. When it is detected from the signal from the rotary-shaft encoder that the carriage unit 42 has moved the scanning distance required, the microprocessor 170 outputs a signal effective to stop the scanner drive motor 44 and thereafter further outputs a signal effective to start the motor 44 into operation in reverse direction. The carriage unit 42 is now driven to move backwardly until it is detected from the signal from the rotary-shaft encoder that the carriage unit 42 has reached a predetermined position on the guide member 38.

With the photosensitive drum 34 scanned by the image scanner assembly 28 as hereinbefore described, the image-carrying beam of light is incident on the peripheral surface of the photosensitive drum 34. The photosensitive drum 34 is driven for rotation at a speed proportional to the speed of movement of the carriage unit 42 and as a consequence the electrostatic image produced on the photosensitive drum 34 is transferred in the form of visible toner images to the print sheet passed over to the drum 34. When the cycle of printing operation is thus complete, the microprocessor 170 proceeds to step B04 to output the signal $S_{SK}$ to de-energize the solenoid-operated actuator unit 112 of the scanner locking means 87. The actuator unit 112 being thus deactivated, the slider plate 92 of the locking means 87 is driven to move into engagement with any of the lock pins 88a, 88b and 88c with the result that the carriage unit 42 is for a second time locked to the ff 40 and is disabled from moving along the guide member 38.

After execution of the step B04, the microprocessor 170 reverts to the main routine program illustrated in FIG. 11 and proceeds to step A02 of the main routine program.

Figure 13A:
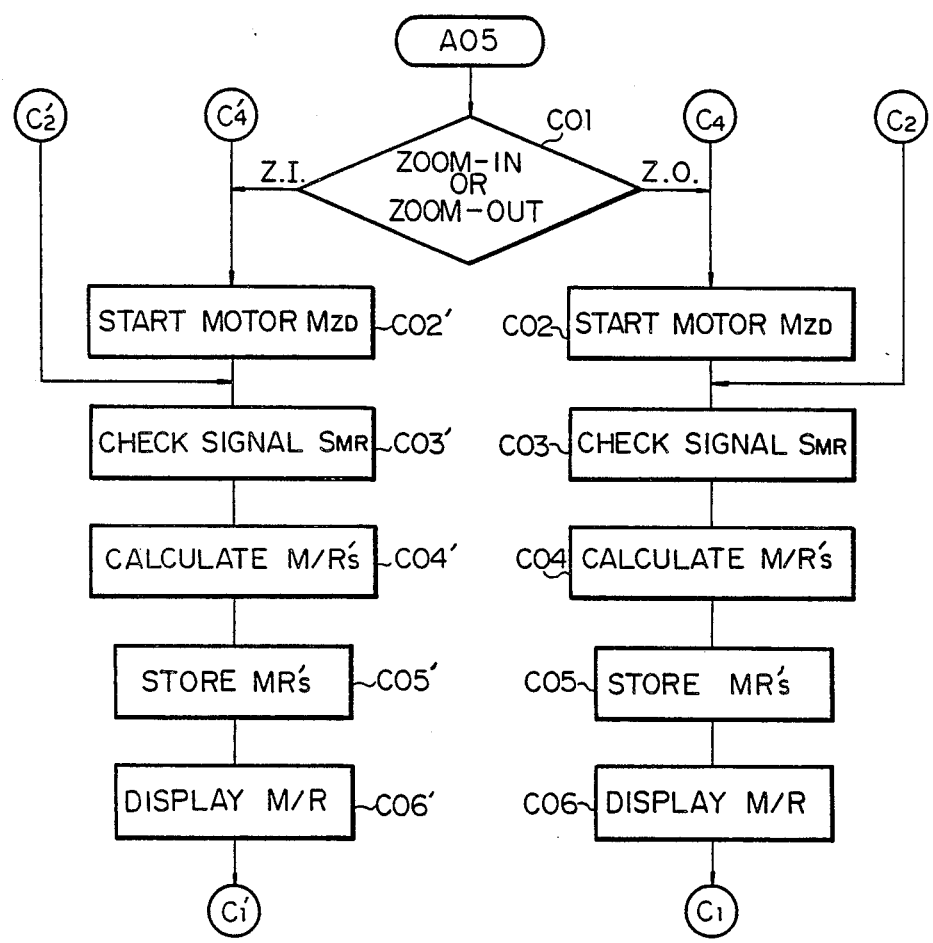
FIGS. 13A, 13B and 13C are flowcharts showing the details of a zoom-in/zoom-out control subroutine program also included in the main routine program illustrated in FIG. 11.
Figure 13B:
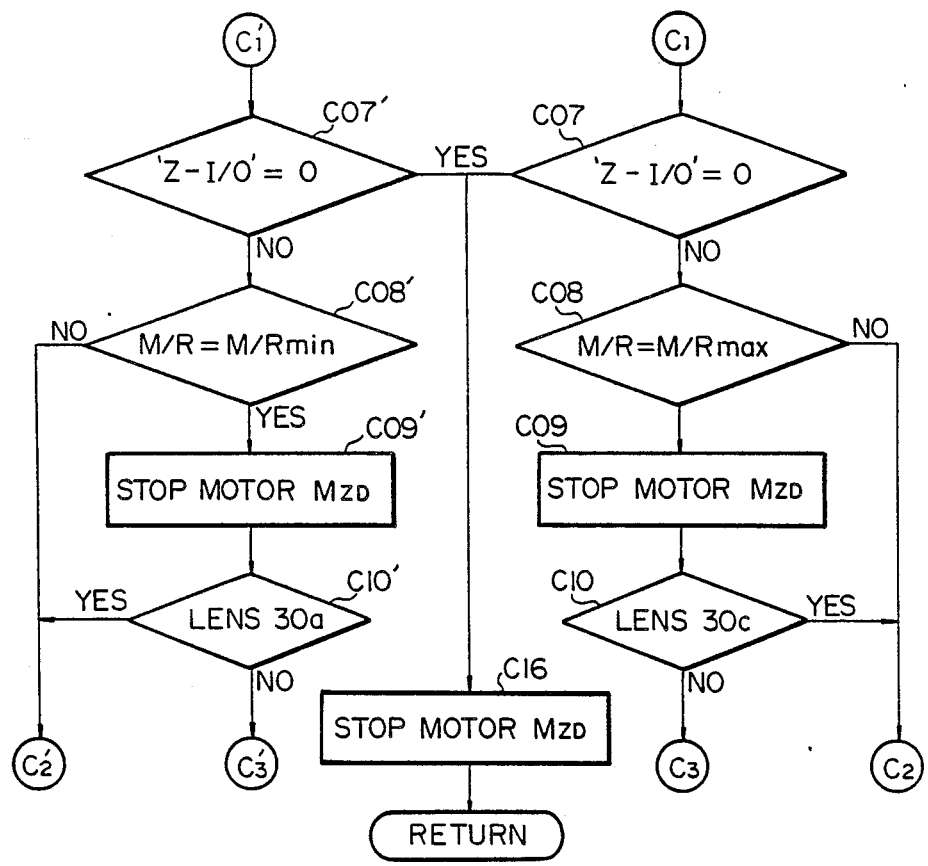
Figure 13C:
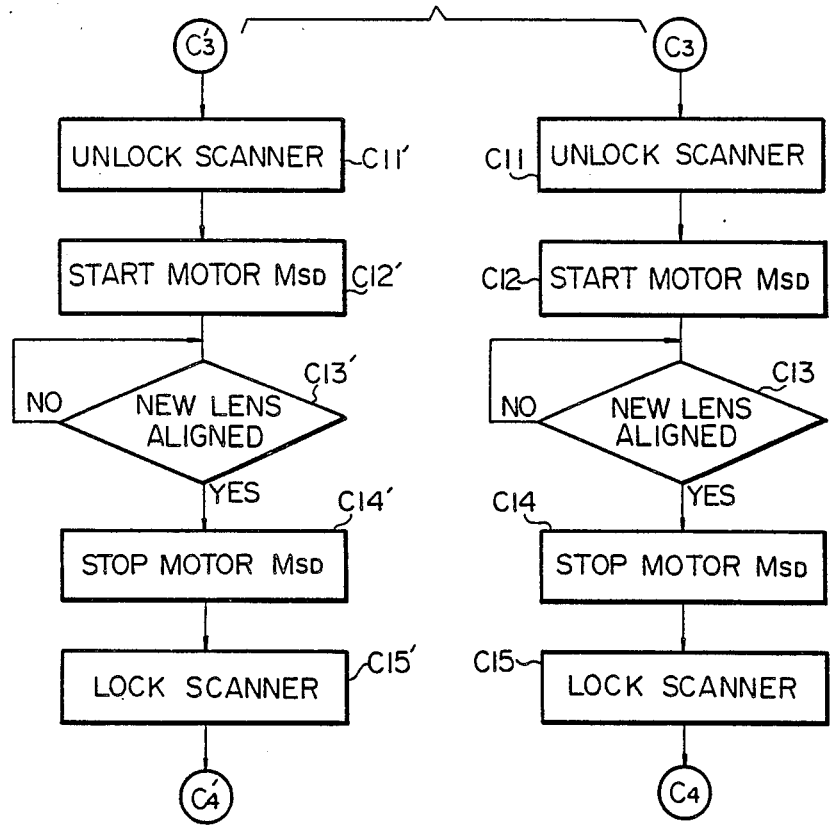

FIGS. 13A to 13C ar flowcharts showing the details of the zoom-in/zoom-out control subroutine program A05 also included in the main routine program hereinbefore described with reference to FIG. 11. This zoom-in/zoom-out control subroutine program A05 is executed when it is determined at step A04 of the main routine program that the zoom-in/zoom-out key 156 on the control panel 150 is depressed.

Referring first to FIG. 13A, the zoom-in/zoom-out control subroutine program A05 starts with a decision step C01 to check if the zoom-in/zoom-out key 156 (which has been confirmed (step A04 of main routine program) is depressed in the zoom-in direction to decrease the magnification ratio or in the zoom-out direction to increase the magnification ratio. If it is determined at this decision step C01 that the zoom-in/zoom-out key 156 is depressed in the zoom-out processor 170 proceeds to one series of steps C02 to C15 and, if it is determined that the key 156 is depressed in the zoom-in direction to decrease the magnification ratio, then the microprocessor 170 proceeds to another series of steps C02' to C15'

When it is determined at step C01 that the zoom-in/zoom-out key 156 is depressed in the zoom-out direction to increase the magnification ratio, the microprocessor 170 first proceeds to step C02 to output a signal to start the zooming drive motor 60 ($M_{ZD}$) into operation for rotation in the forward direction. If it is determined at step C01 that the key 156 is depressed in the zoom-indirection to decrease the magnification ratio, then the microprocessor 170 first proceeds to step C02' to output a signal to start the zooming drive motor 60 into operation for rotation in the reverse direction. The power output of the zooming drive motor 66 is transmitted by the drive chain 56 to the zoom control gears 52a, 52b and 52c respectively associated with the projection lenses 30a, 30b and 30c. Each of the projection lenses 30a, 30b and 30c is thus driven to axially move in a direction to increase or decrease the magnification ratio within the range predetermined for the particular lens 30a, 30b or 30c.

The microprocessor 170 then proceeds to step C03 or step C03' to count the number of the pulses generated as the signal $S_{MR}$ from the rotary-shaft encoder unit 64 and outputs at subsequent step C04 or step C04' data representative of the magnification ratio currently achievable by each of the projection lenses 30a, 30b and 30c. The number of the pulses generated as the signal $S_{MR}$ from the rotary-shaft encoder unit 64 is indicative of the angle of turn of each of the projection lenses 30a, 30b and 30c and is, for this reason, the magnification ratio achievable by each projection lens is a function of the number of the pulses output from the encoder unit 64. The functional relationships between the angles of turn of each projection lens and the corresponding magnification ratios to be achieved by each of the projection lenses 30a, 30b and 30c may be stored in the form of table data within the read-only memory 172 (FIG. 9). In executing the step C04 or step C04', the microprocessor 170 may selectively fetch data from the read-only memory 172 to determine the magnification ratios currently achievable by the projection lenses 30a, 30b and 30c. Where the data representing the magnification ratios achievable by each of the projection lenses 30a, 30b and 30c is thus stored in terms of the angles of turn of each, any desired magnification-ratio-angle-of-turn characteristics rather than the linearly varying characteristics shown in FIG. 6 may be used for each of the projection lenses 30a, 30b and 30c.

Subsequently to step C04 or step C04', the microprocessor 170 proceeds to step C05 or step C05', respectively, at which the data representative of the magnification ratios currently achievable by the projection lenses 30a, 30b and 30c are loaded into the data storage areas of the memory 174 (FIG. 9). The step C05 or step C05' is followed by step C06 or step C06', respectively, at which the microprocessor 170 performs jobs to display the magnification ratio currently achievable by the projection lens which is currently held in the optically aligned position previously defined. The magnification ratio is displayed on a display window provided on the control panel 150 or elsewhere on the apparatus under consideration, though not shown in the drawings.

Thereafter, the microprocessor 170 proceeds to step C07 or step C07' shown in FIG. 13B to check if there is present the signal "Z-I/O" of logic value "0" with the zoom-in/zoom-out key 156 on the control panel 150 released from the operative manipulative effort. In the presence detected of the signal "Z-I/O" of logic value "0" and accordingly the answer for the step C07 or step C07' is given in the affirmative, the microprocessor 170 proceeds to step C16 to output the signal to stop the zooming drive motor 60 ($M_{ZD}$) and thereafter reverts to the main routine program described with reference to FIG. 11.

If it is detected at step C07 or step C07' that there is not present the signal "Z-I/O" of logic value "0" and accordingly the answer for the step C07 or step C07' is given in the negative, then the microprocessor 170 proceeds to step C08 or step C08', respectively, and checks if the magnification ratio determined for each of the projection lenses 30a, 30b and 30c through execution of the step C04 or step C04' equals the maximum ratio M/$R_{max}$ or the minimum ratio M/$R_{min}$, respectively, of the range of magnification ratio prescribed for each projection lens. The maximum and minimum ratios of the ranges of magnification ratio assigned to the individual projection lenses 30a, 30b and 30c are read out from the read-only memory 172 (FIG. 9). If it is found at step C08 or step C08' that the magnification ratio determined for each of the projection lenses 30a, 30b and 30c is not equal to the maximum ratio M/$R_{max}$ or the minimum ratio M/$R_{min}$, respectively, of the range of magnification ratio prescribed for each projection lens, the answer for the step C08 or step C08' is given in the negative so that the microprocessor 170 determines that the magnification ratio achievable for each of the projection lenses 30a, 30b and 30c can be further increased or decreased, respectively. In this instance, the microprocessor 170 returns to step C03 or step C03', respectively, and repeats the loop of the steps C03 to C08 or the loop of the steps C03' to C08'.

When it is found at step C08 or step C08' that the magnification ratio determined for each of the projection lenses 30a, 30b and 30c is equal to the maximum ratio M/$R_{max}$ or the minimum ratio M/$R_{min}$, respectively, of the range of magnification ratio prescribed for each projection lens. The answer for the step C08 or step C08' being thus given in the affirmative, the microprocessor 170 determines that the magnification ratio achievable for each of the projection lenses 30a, 30b and 30c can be no longer increased or decreased, respectively, and as such the microprocessor 170 proceeds from step C08 or step C08' to step C09 or step C09' to output the signal to stop the zooming drive motor 60 ($M_{ZD}$). Subsequently to step C09, the microprocessor 170 checks at step C10 whether or not the projection lens currently held in the optically aligned position is the third projection lens 30c to which the highest range of magnification ratio is assigned. On the other hand, the step C09' is followed by step C10' at which the microprocessor 170 determines whether or not the projection lens currently held in the optically aligned position is the first projection means 30a to which the lowest range of magnification ratio is assigned. The decision at step C10 or step C10' is made on the basis of the signal $S_{SL}$ produced by the selected lens detector provided in association with the apertured members 80a, 80b and 80c attached to the carriage unit 42.

If it is fond at step C10 that the projection lens currently held in the optically aligned position is the third projection lens 30c and thus the answer for the step C10 is given in the affirmative, the microprocessor 170 determines that the magnification ratio achievable in the apparatus could not be further increased and, for this reason, returns to step C03 to repeat the loop of the steps C03 to C10. If, alternatively, it is found at step C10' that the projection lens currently held in the optically aligned position is the first projection lens 30a and thus the answer for the step C10' is given in the affirmative, the microprocessor 170 determines that the magnification ratio achievable in the apparatus could not be further decreased and, for this reason, returns to step C03' to repeat the loop of the steps C03' to C10'. On the other hand, when it is found at step C10 that the projection lens currently held in the optically aligned position is not the third projection lens 30c or at step C10' that the projection lens currently held in the optically aligned position is not the first projection lens 30a, then the microprocessor 170 proceeds to step C11 or step C11', respectively, shown in FIG. 13C. It will be apparent that the negative answer for the step C10 indicates that it is either the first or second projection lens 30a or 30b which is currently held in the optically aligned position and, likewise, the negative answer for the step C10' indicates that it is either the second or third projection lens 30b or 30c which is currently held in the optically aligned position.

At step C11 or step C11', the microprocessor 170 outputs the signal $S_{SK}$ to energize the solenoid-operated actuator unit 112 of the scanner locking means 87 (FIG. 7). The solenoid-operated actuator unit 112 being thus activated, the slider plate 92 of the scanner locking means 87 is driven to retract from the position engaging any of the lock pins 88a, 88b and 88c with the result that the carriage unit 42 is unlocked and is allowed to move along the guide member 38 (FIG. 2). Subsequently to step C11, the microprocessor 170 proceeds to step C12 to output the signal effective to start the scanner drive motor 44 ($M_{SD}$) into operation to drive the carriage unit 42 to move forwardly on the guide member 38 so that the second or third projection lens 30b or 30c in place of the first or second projection lens 30a or 30b, respectively, which has been held in the optically aligned position is moved to the optically aligned position. Alternatively, the microprocessor 170 proceeds from step C11' to step C12' to output the signal to start the scanner drive motor 44 ($M_{SD}$) into operation to drive the carriage unit 42 to move in the reverse direction on the guide member 38 so that the first or second projection lens 30a or 30b in place of the second or third projection lens 30b or 30c, respectively, which has been held in the optically aligned position is moved to the optically aligned position.

After the second or third projection lens 30b or 30c is moved to the optically aligned position through execution of the step C12, the microprocessor 170 proceeds to step C13 to check if the second or third projection lens 30b or 30c is currently held in the optically aligned position thereof. Alternatively, subsequently to step C12', the microprocessor 170 proceeds to step C13' to check if the first or second projection lens 30a or 30b is currently held in the optically aligned position thereof. It will be understood that the decision at sep C13 or step C13' is made on the basis of the signal $S_{SL}$ from the selected lens detector. If the answer for the step C13 or C13' is given in the negative, the step C13 or step C13' is repeatedly executed until the answer for the step turns affirmative.

When it is confirmed at step C13 that the second or third projection lens 30b or 30c is moved to the optically aligned position or at step C13' that the first or second projection lens 30a or 30b is currently held in the optically aligned position thereof, the microprocessor 170 proceeds to step C14 or step C14', respectively to output the signal to bring the scanner drive motor 44 to a stop. Thereafter, the microprocessor 170 proceeds to step C15 or step C15' to output the signal $S_{SK}$ to de-energize the solenoid-operated actuator unit 112 of the scanner locking means 87. The actuator unit 112 being thus de-activated, the slider plate 92 of the locking means 87 is driven to move into engagement with the lock pin 88a, 88b or 88c associated with the projection lens currently held in the optically aligned position. The carriage unit 42 is now for a second time locked to the ff 40 and is disabled from moving along the guide member 38.

After the new projection lens is thus moved into the optically aligned position in place of the projection lens previously held in the optically aligned position, the microprocessor 170 returns to step C02 or step C02' and reiterates the series of steps C02 to C15 or the series of steps C02' to C15' until the magnification ratio selected at the zoom-in/zoom-out key 156 is achieved by any of the projection lenses 30a, 30b and 30c or the maximum or minimum ratio of the range of magnification ratio assigned to any of the projection lenses 30a, 30b and 30c is reached.

When it is thus found at step C07 or step C07' that the zoom-in/zoom-out key 156 on the control panel 150 is released from the operative manipulative effort so that the signal "Z-I/O" of logic value "0" is present, the microprocessor 170 proceeds to step C16 to output the signal to stop the zooming drive motor 60 ($M_{ZD}$) and thereafter reverts to the main routine program described with reference to FIG. 11.

FIG. 14 is a flowchart showing the details of the stored magnification ratio zoom control subroutine program A07 included in the main routine program hereinbefore described with reference to FIG. 11. This stored magnification ratio zoom control subroutine program A07 is executed when it is determined at step A06 of the main routine program that there is present a signal "Z/M" of logic value "1" with the zoom memory key 162 on the control panel 150 depressed.

After the zoom memory key 162 o the control panel 150 is depressed, any of the memory area select keys 164 will be depressed to select the data storage area 174a, 174b or 174c of the random-access memory 174 (FIG. 10) from which the magnification ratio data is to be read out. The operator will then depress the memory zoom key 162 to call the required data from the selected data storage area 174a, 174b or 174c of the memory 174. The microprocessor 170 then proceeds to step D01 of the subroutine program A07 and references the data stored in the read-only memory 172 in respect of the respective ranges of magnification ratio assigned to the individual projection lenses 30a, 30b and 30c. At this step D01, the microprocessor 170 thus determines which of the projection lenses 30a, 30b and 30c should be selected for use to achieve the required magnification ratio.

When any one of the projection lenses 30a, 30b and 30c is thus selected through execution of the step D01, the microprocessor 170 proceeds to step D02 to check if the selected projection lens 30a, 30b or 30c is identical with the projection lens currently held in the optically aligned position. This test is made on the basis of the signal $S_{SL}$ from the selected lens detector. If it is found at this step D02 that the selected projection lens 30a, 30b or 30c is not identical with the projection lens currently held in the optically aligned position and thus the answer for the step D02 is given in the negative, the microprocessor 170 proceeds to step D03 or step D03' to output the signal $S_{SK}$ to energize the solenoid-operated actuator unit 112 of the scanner locking means 87. The solenoid-operated actuator unit 112 being thus activated, the slider plate 92 of the scanner locking means 87 is driven to retract from the position engaging ay of the lock pins 88a, 88b and 88c with the result that the carriage unit 42 is unlocked and is allowed to move along the guide member 38. Subsequently to step D03 or step D03', the microprocessor 170 proceeds to step D04 or step D04', respectively, to output the signal effective to start the scanner drive motor 44 ($M_{SD}$) into operation to drive the carriage unit 42 to move in the forward or reverse direction on the guide member 38 so that one of the projection lenses other than the projection lens currently held in the optically aligned position is moved to the optically aligned position.

Subsequently to step D04 or step D04' or when it is determined at step D02 that the selected projection lens 30a, 30b or 30c is identical with the projection lens currently held in the optically aligned position, the microprocessor 170 proceeds to step D05 to output the signal to start the zooming drive motor 60 ($M_{ZD}$) into operation for rotation in the forward or reverse direction. Each of the projection lenses 30a, 30b and 30c is thus driven to axially move in a direction to increase or decrease the magnification ratio within the range predetermined for the particular lens 30a, 30b or 30c. The microprocessor 170 then proceeds to step D06 to check if the currently selected projection lens 30a, 30b or 30c is correctly held in the optically aligned position thereof. If the answer for the step D06 is given in the negative, the microprocessor 170 proceeds to step D07 to detect whether or not the magnification ratio provided by the selected projection lens 30a, 30b or 30c being axially moved on the carriage unit 42 being moved along the guide member 38 is equalized with the magnification ratio represented by the data fetched from the read only memory 172. If the answer for this step D07 is given in the negative, the microprocessor 170 returns to sep D06 and repeats the loop of the step D06 and D07 until the answer for the step D07 turns affirmative.

Figure 14B:
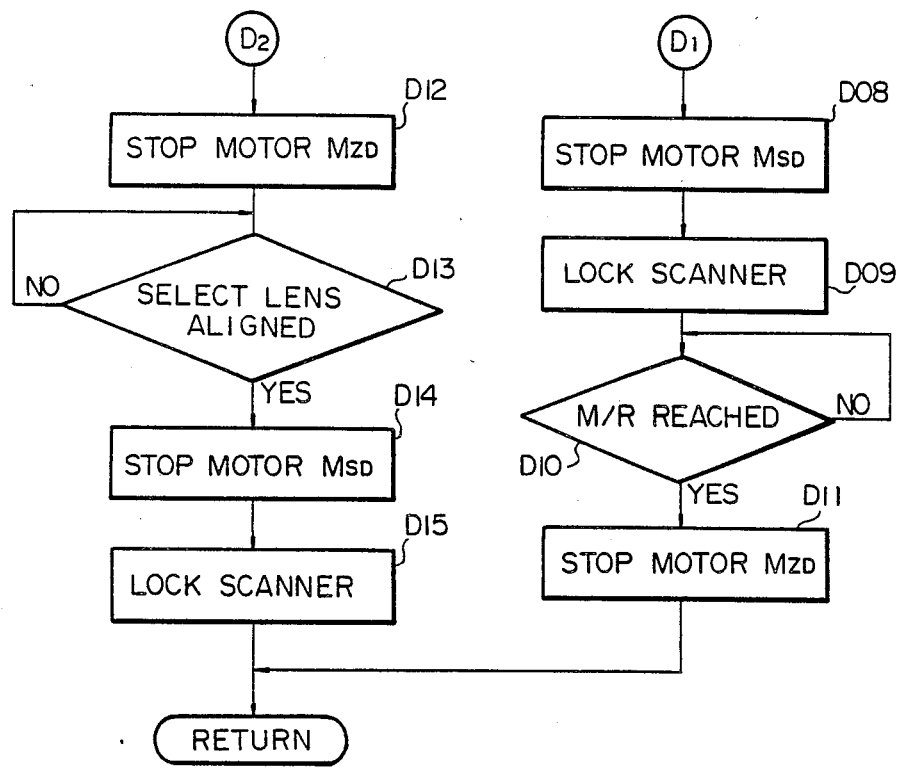

When it is found at step D06 that the currently selected projection lens 30a, 30b or 30c is correctly held in the optically aligned position thereof and thus the answer for the step D06 is given in the affirmative, then the microprocessor 170 proceeds to step D08 shown in FIG. 14B to output the signal to bring the scanner drive motor 44 to a stop. Thereafter, the microprocessor 170 proceeds to step D09 to output the signal $S_{SK}$ to de-energize the solenoid-operated actuator unit 112 of the scanner locking means 87 so that the carriage unit 42 is locked again to the ff 40 and is disabled from moving along the guide member 38. The step D09 is followed by step D10 at which the microprocessor 170 detects whether or not the magnification ratio provided by the selected projection lens 30a, 30b or 30c being axially moved on the carriage unit 42 now held at rest on the guide member 38 is equalized with the magnification ratio represented by the data fetched from the read-only memory 172. If the answer for this step D10 is given in the negative, the microprocessor 170 repeats the step D10 until the answer for the step D10 turn affirmative.

When it is found at step D10 that the currently selected projection lens 30a, 30b or 30c is correctly held in the optically aligned position thereon and thus the answer for the step D10 is given in the affirmative, then the microprocessor 170 proceeds to step D11 to output the signal to stop the zooming drive motor 60 ($M_{ZD}$). Subsequently to this step D11, the microprocessor 170 returns to the main routine program described with reference to FIG. 11.

When it is determined at step D07 that the magnification ratio provided by the selected projection lens 30a, 30b or 30c being axially moved on the carriage unit 42 is equalized with the magnification ratio represented by the data fetched from the read-only memory 172 and the answer for this step D07 is given in the negative, the microprocessor 170 proceeds to step D12 to output the signal to stop the zooming drive motor 60 ($M_{ZD}$). Subsequently to this step D12, the microprocessor 170 proceeds to step D13 to check if the currently selected projection lens 30a, 30b or 30c is held in the optically aligned position thereof. If the answer for this step D13 is given in the negative, the microprocessor 170 repeats the step D13 until the answer for the step D13 turns affirmative.

When it is confirmed at step D13 that the currently selected projection lens 30a, 30b or 30c is held in the optically aligned position thereof, the microprocessor 170 proceeds to step D14 to output the signal to bring the scanner drive motor 44 to a stop. Thereafter, the microprocessor 170 proceeds to step D15 to output the signal $S_{SK}$ to de-energize the solenoid-operated actuator unit 112 of the scanner locking means 87. The actuator unit 112 being thus de-activated, the carriage unit 42 is locked to the ff 40 and is disabled from moving along the guide member 38. Upon termination of this step D15, the microprocessor 170 returns to the main routine program described with reference to FIG. 11.

Figure 15:
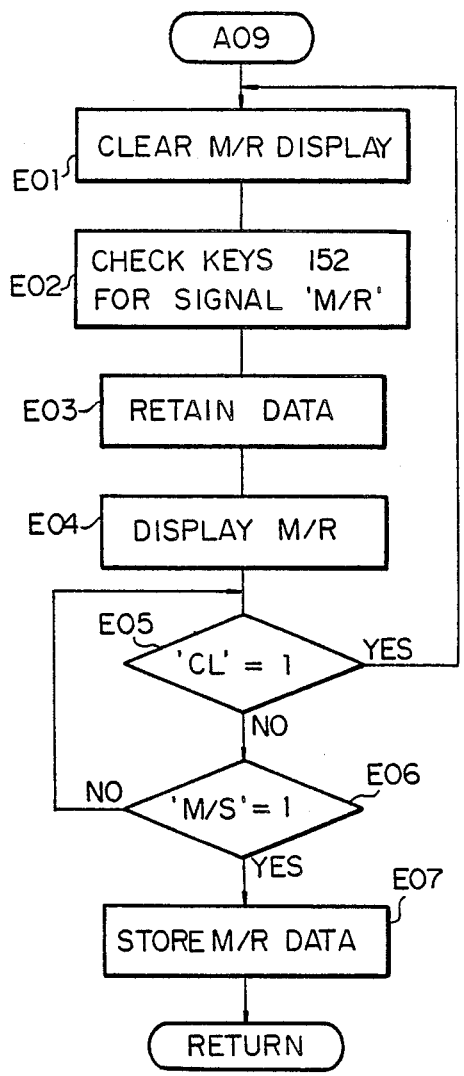
FIG. 15 is a flowchart showing the details of a magnification ratio store control subroutine program also included in the main routine program illustrated in FIG. 11.

FIG. 15 is a flowchart showing the details of the magnification ratio store control subroutine program A09 also included in the main routine program hereinbefore described with reference to FIG. 11. This magnification ratio store control subroutine program A09 is executed when it is determined at step A08 of the main routine program that the memory set key 160 on the control panel 150 is depressed.

In the presence detected of the signal "M/Z" of logic value "1" which is produced with the memory set key 160 depressed on the control panel, the microprocessor 170 proceeds to stp E01 to clear the numerical value of the magnification ratio currently indicated in the display window (not shown) on the control panel 150. The microprocessor 170 then proceeds to step E02 to await receiving magnification ratio data which is to be produced with any of the numerical keys 154 on the control panel 150 depressed. When such data is received at step E02, the microprocessor 170 proceeds to step 003 to retain the data therein and at step E04 displays in the display window on the control panel 150 the numerical value of the magnification ratio represented by the data received.

Thereupon, the microprocessor 170 proceeds to step E05 to check if there is a signal "CL" of logic logic value "1" produced with the clear key 168 detect whether or not the. If it is found at this step E05 that there is the such signal "CL" so that the answer for the step E05 is given in the affirmative, the microprocessor 170 reverts to step E01 to repeat the loop of the steps E01 to E05 until the answer for the step E05 turns negative. When it is thus detected at step E05 that there is no signal "CL" of logic logic value "1", the microprocessor 170 proceeds to step 005 to check if there is present a signal "M/S" of logic value "1" with the memory set key 160 on the control panel 150 depressed. When it is detected at step E06 that there is no signal "M/S" of logic logic value "1", the microprocessor 170 returns to step E06 to repeat the loop of the steps E05 and E05 until the answer for the step E06 turns affirmative. When it is thus detected at step E06 that there is the signal "M/S" of logic value "1" and thus the answer for the step E06 is given in the affirmative, the microprocessor 170 proceeds to step E07 to load the data into one of the selected data storage area 174a, 174b or 174c of the memory 174 selected by any of the keys 164 and thereafter displays in the display window on the control panel 150 the numerical value of the magnification ratio represented by the data received. Upon termination of the step E07, the microprocessor 170 reverts to the main routine program described with reference to FIG. 11.

Figure 16:
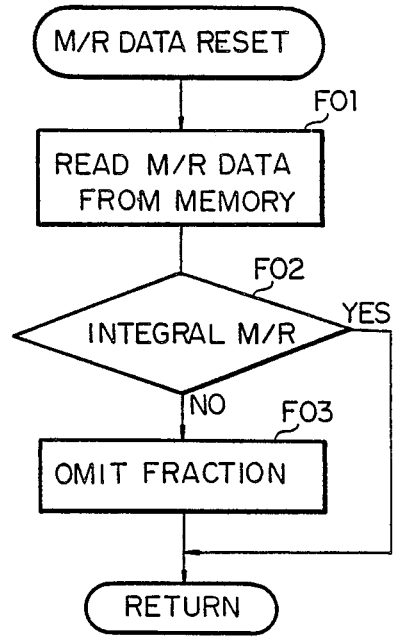
FIG. 16 is a flowchart showing the details of a magnification ratio reset subroutine program included in the main routine program illustrated in FIG. 11.

As has been described with reference to FIG. 3, the apparatus embodying the present invention comprises the integral magnification ratio detector responsive to any of the apertures 84 in the zoom control gear 52 to produce an integral magnification ratio signal $S_{IMR}$ of logic value "1". The integral magnification ratio signal $S_{IMR}$ of logic value "1" thus output from the integral magnification ratio detector indicates that the projection lens associated with the apertured zoom control gear and accordingly each of the other projection lenses 30a, 30b and 30c is in a rotational position providing any one of the integral magnification ratios achievable by the projection lens. As has been further noted, the integral magnification ratio signal $S_{IMR}$ is used to clear the magnification ratio data which has once stored in the memory 174. FIG. 16 is a flowchart showing the details of a magnification ratio data reset subroutine program to be executed to achieve such a function of the microprocessor 170. The microprocessor 170 interrupts the main routine program and executes this magnification ratio data reset subroutine program when it is detected that the integral magnification ratio signal $S_{IMR}$ of logic value "1" is output from the integral magnification ratio detector.

The microprocessor 170 in receipt of the integral magnification ratio signal $S_{IMR}$ of logic value "1" first proceeds to step F01 to fetch the magnification ratio data for each of the projection lenses 30a, 30b and 30c from the memory 174. The microprocessor 170 then detects at step F02 whether or not the magnification ratio represented by the data thus fetched from the memory 174 is an integral ratio. If it is found at this step F02 that the magnification ratio represented by the data is an integral ratio and accordingly the answer for the step F02 is given in the affirmative, the microprocessor 170 stops execution of this subroutine program and returns to the main routine program.

On the other hand, if it is found at step F02 that the magnification ratio represented by the data fetched from the memory 174 is a fractional ratio and thus the answer for the step F02 is given in the negative, then the microprocessor 170 proceeds to step F03 to eliminate the fraction in the magnification ratio represented by the data and store the resultant integral magnification ratio data into the memory 174 to update the data which has thus far been stored therein, for the current reader/-printer mode of operation. In this manner, the magnification ratio to be effectively used can be regulated with a sufficient degree of accuracy if there is any discrepancy between the magnification ratio actually achievable by the projection lens currently in the optically aligned position and the magnification ratio represented by the data which has been stored in the memory 174.

While it has been assumed in the described embodiment of the present invention that the image scanner assembly 28 uses three projection lenses, any desired number of projection lenses may be used in a microfilm image processing apparatus according to the present invention. The projection lenses used in the embodiment of the present invention have been assumed to be of the zoom type but, if desired, projection lenses of the fixed-focus type may be used alternatively.

What is claimed is:

1. A microfilm image processing apparatus comprising
   (a) zoom lens means for projecting an image-carrying beam of light carrying images on a microfilm strip, said zoom lens means comprising a movable member and capable of providing a magnification/reduction ratio variable with movement of said movable member,
   (b) means for imparting a driving force to said movable member to cause the movable member to move and vary the magnification/reduction ratio to be achieved by said zoom lens means,
   (c) displacement detecting means for detecting the amount of displacement of said movable member for thereby determining the magnification/reduction ratio to be achieved by said zoom lens means,
   (d) feature means provided on said movable member,
   (e) feature detecting means for detecting said feature means, the feature detecting means being disposed to be responsive to said feature means when said movable member is moved to a position enabling said zoom lens means to provide a predetermined magnification/reduction ratio, and
   (f) correcting means for correcting the magnification/reduction ratio determined by said displacement detecting means when said feature means is detected by said feature detecting means.

2. A microfilm image processing apparatus as set forth in claim 1, in which said zoom lens means comprises at least one cylindrical zoom lens and in which said movable member is implemented by a zoom control gear disposed around said zoom lens and is rotatable with respect to the zoom lens about the center axis of the lens.

3. A microfilm image processing apparatus as set forth in claim 2, in which said displacement detecting means comprises a light emitting element located on one side of said zoom control gear and a light receiving element located on the opposite side of said zoom control gear and substantially aligned with said light emitting element across said gear, said displacement detecting means being operative to detect the teeth of said gear in response the interception of a beam of light emitted from said light emitting toward said light receiving element.

4. A microfilm image processing apparatus as set forth in claim 1, further comprising memory means for storing data representative of the magnification/reduction ratio determined by said displacement detecting means, wherein said displacement detecting means comprises a rotary-shaft encoder operative to generate pulses in a number proportional to the detected amount of displacement of said movable member, and pulse counting means for counting the number of the pulses generated by said rotary-shaft encoder, said feature detecting means being disposed to be responsive to said feature means when said zoom control gear is turned to an angular position enabling said zoom lens means to provide said predetermined magnification/reduction ratio, said correcting means being operative to correct the magnification/reduction ratio represented by the data stored in said memory means when said feature means is detected by said feature detecting means.

* * * * *